US012688500B2

(12) United States Patent (10) Patent No.: US 12,688,500 B2
Zhang et al. (45) Date of Patent: Jul. 21, 2026

(54) METHOD, BLOCKCHAIN SYSTEM, APPARATUS, PROGRAM, AND MEDIUM FOR BLOCKCHAIN AUTHORITY MANAGEMENT

(71) Applicant: CHINA ACADEMY OF INFORMATION AND COMMUNICATIONS TECHNOLOGY, Beijing (CN)

(72) Inventors: Yuwen Zhang, Beijing (CN); Cheng Chi, Beijing (CN); Yang Liu, Beijing (CN); Siyu Zhu, Beijing (CN); Juan Tian, Beijing (CN)

(73) Assignee: CHINA ACADEMY OF INFORMATION AND COMMUNICATIONS TECHNOLOGY, Beijing (CN)

( * ) Notice: Subject to any disclaimer, the term of this patent is extended or adjusted under 35 U.S.C. 154(b) by 283 days.

(21) Appl. No.: 18/706,574

(22) PCT Filed: Jun. 6, 2022

(86) PCT No.: PCT/CN2022/097227
§ 371 (c)(1),
(2) Date: May 1, 2024

(87) PCT Pub. No.: WO2023/077795
PCT Pub. Date: May 11, 2023

(65) Prior Publication Data
US 2026/0154676 A1 Jun. 4, 2026

(30) Foreign Application Priority Data

Nov. 4, 2021 (CN) .......................... 202111297102.0

(51) Int. Cl.
*G06Q 20/38* (2012.01)
*G06Q 20/14* (2012.01)
(Continued)

(52) U.S. Cl.
CPC ......... *G06Q 20/3823* (2013.01); *G06Q 20/14* (2013.01); *G06Q 20/3674* (2013.01);
(Continued)

(58) Field of Classification Search
CPC .............. G06Q 20/3823; G06Q 20/14; G06Q 20/3674; G06Q 20/3825; G06Q 20/401; G06Q 2220/00
See application file for complete search history.

(56) References Cited

U.S. PATENT DOCUMENTS 10,102,265 B1 * 10/2018 Madisetti ............... G06Q 20/06
11,455,642 B1 * 9/2022 Jameson .............. G06Q 20/108
(Continued)

FOREIGN PATENT DOCUMENTS

CN 110310094 A 10/2019
CN 110992029 A 4/2020
(Continued)

OTHER PUBLICATIONS

Stefanos Leonardos, et al., Weighted Voting on the Blockchain: Improving Consensus in Proof of Stake Protocols, Mar. 11, 2019, arXiv.org, pp. 1-18 (Year: 2019).*
(Continued)

*Primary Examiner* — Nilesh B Khatri
(74) *Attorney, Agent, or Firm* — BROOKS KUSHMAN P.C.

(57) ABSTRACT

A method, a blockchain system, an apparatus, a program, and a medium, for blockchain authority management. Receiving, by a first node, a node operation request for a second node, the first node being a node manager in the
(Continued)

blockchain system; voting, by the first node, on the node operation request, sending a first voting request to another node manager, obtaining a voting result and a voting signature fed back by the another node manager, packaging the obtained voting result and voting signature into a first block, and broadcasting the first block to the blockchain system; verifying, by at least one blockchain node, the voting result and voting signature in the first block, and adding the first block into a local ledger if the voting result and voting signature pass verification; and responding to the node operation request if the voting result in the first block satisfies a first preset condition.

20 Claims, 7 Drawing Sheets

(51) Int. Cl.
*G06Q 20/36* (2012.01)
*G06Q 20/40* (2012.01)
(52) U.S. Cl.
CPC ....... *G06Q 20/3825* (2013.01); *G06Q 20/401* (2013.01); *G06Q 2220/00* (2013.01)

(56) References Cited

U.S. PATENT DOCUMENTS

| | | | | |
|---|---|---|---|---|
| 2017/0323392 | A1* | 11/2017 | Kasper | H04L 63/123 |
| 2018/0349621 | A1* | 12/2018 | Schvey | H04L 9/3236 |
| 2019/0034917 | A1* | 1/2019 | Nolan | G06K 7/10475 |
| 2019/0236562 | A1* | 8/2019 | Padmanabhan | H04L 63/00 |
| 2019/0238311 | A1* | 8/2019 | Zheng | H04L 9/006 |
| 2019/0251556 | A1* | 8/2019 | McCormick | G06Q 20/389 |
| 2019/0305938 | A1* | 10/2019 | Sandberg-Maitland | H04L 9/085 |
| 2020/0059369 | A1* | 2/2020 | Li | H04L 9/0643 |
| 2020/0089720 | A1* | 3/2020 | Dallara | G06Q 20/381 |
| 2021/0056548 | A1* | 2/2021 | Monica | G06Q 20/38215 |
| 2021/0142300 | A1 | 5/2021 | Anderson et al. | |

FOREIGN PATENT DOCUMENTS

| | | |
|---|---|---|
| CN | 112801662 A | 5/2021 |
| CN | 113723962 A | 11/2021 |

OTHER PUBLICATIONS

Jason Paul Cruz, et al., RBAC-SC: Role-Based Access Control Using Smart Contract, Mar. 7, 2018, IEEE, pp. 12240-12250 (Year: 2018).*
Orlenys Lopez-Pintado, et al., Dynamic Role Binding in Blockchain-Based Collaborative Business Processes, Dec. 7, 2018, arXiv.org, pp. 1-15 (Year: 2018).*
International Search Report of PCT/CN2022/097227 mailed Sep. 8, 2022, 2 pages.

* cited by examiner

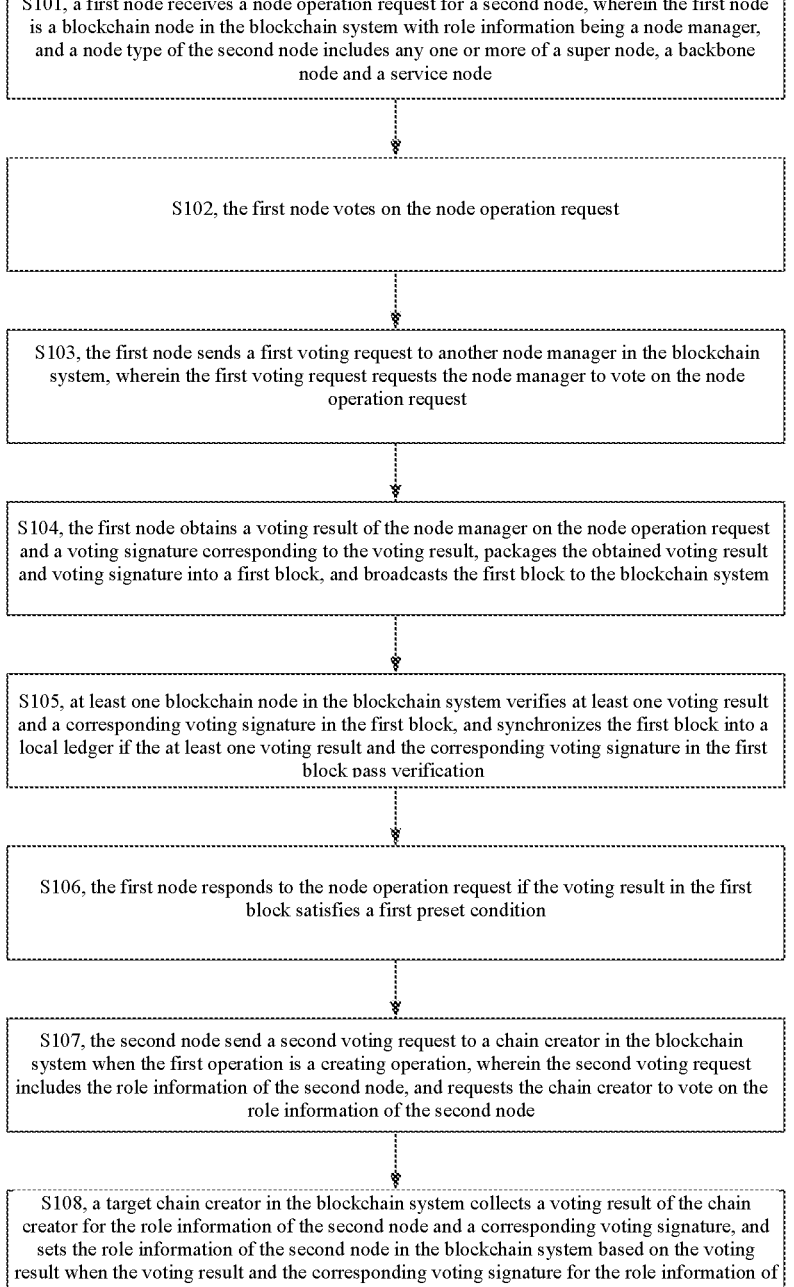

S101, a first node receives a node operation request for a second node, wherein the first node is a blockchain node in the blockchain system with role information being a node manager, and a node type of the second node includes any one or more of a super node, a backbone node and a service node S102, the first node votes on the node operation request S103, the first node sends a first voting request to another node manager in the blockchain system, wherein the first voting request requests the node manager to vote on the node operation request S104, the first node obtains a voting result of the node manager on the node operation request and a voting signature corresponding to the voting result, packages the obtained voting result and voting signature into a first block, and broadcasts the first block to the blockchain system S105, at least one blockchain node in the blockchain system verifies at least one voting result and a corresponding voting signature in the first block, and synchronizes the first block into a local ledger if the at least one voting result and the corresponding voting signature in the first block pass verification S106, the first node responds to the node operation request if the voting result in the first block satisfies a first preset condition S107, the second node send a second voting request to a chain creator in the blockchain system when the first operation is a creating operation, wherein the second voting request includes the role information of the second node, and requests the chain creator to vote on the role information of the second node S108, a target chain creator in the blockchain system collects a voting result of the chain creator for the role information of the second node and a corresponding voting signature, and sets the role information of the second node in the blockchain system based on the voting result when the voting result and the corresponding voting signature for the role information of the second node pass verification

Fig. 1

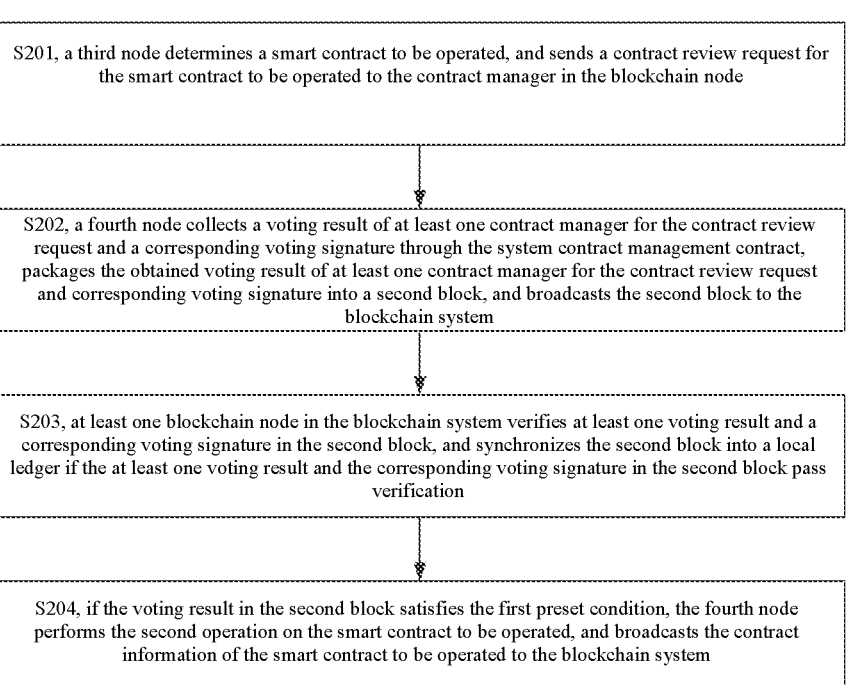

S201, a third node determines a smart contract to be operated, and sends a contract review request for the smart contract to be operated to the contract manager in the blockchain node S202, a fourth node collects a voting result of at least one contract manager for the contract review request and a corresponding voting signature through the system contract management contract, packages the obtained voting result of at least one contract manager for the contract review request and corresponding voting signature into a second block, and broadcasts the second block to the blockchain system S203, at least one blockchain node in the blockchain system verifies at least one voting result and a corresponding voting signature in the second block, and synchronizes the second block into a local ledger if the at least one voting result and the corresponding voting signature in the second block pass verification S204, if the voting result in the second block satisfies the first preset condition, the fourth node performs the second operation on the smart contract to be operated, and broadcasts the contract information of the smart contract to be operated to the blockchain system

Fig. 2

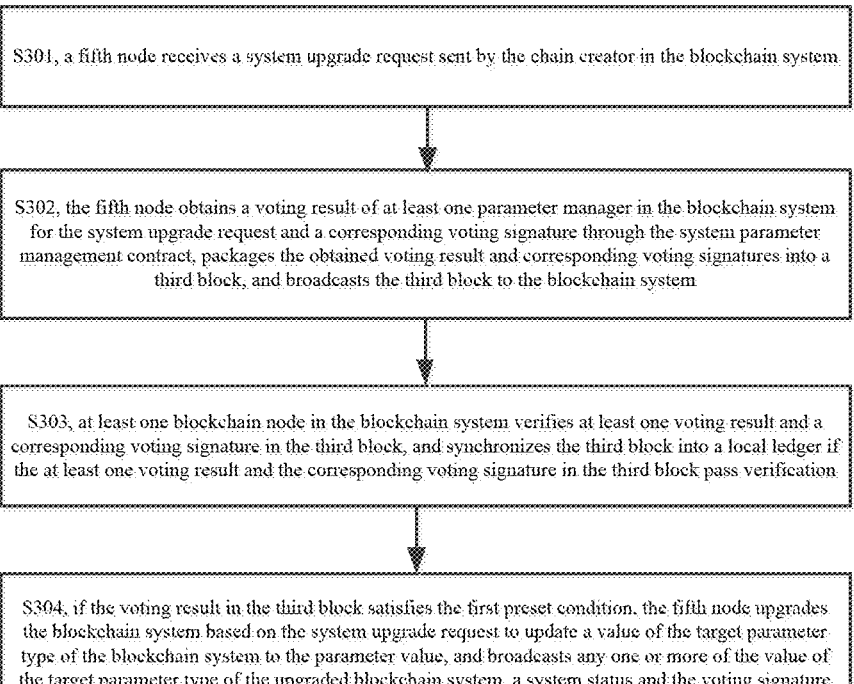

S301, a fifth node receives a system upgrade request sent by the chain creator in the blockchain system S302, the fifth node obtains a voting result of at least one parameter manager in the blockchain system for the system upgrade request and a corresponding voting signature through the system parameter management contract, packages the obtained voting result and corresponding voting signatures into a third block, and broadcasts the third block to the blockchain system S303, at least one blockchain node in the blockchain system verifies at least one voting result and a corresponding voting signature in the third block, and synchronizes the third block into a local ledger if the at least one voting result and the corresponding voting signature in the third block pass verification S304, if the voting result in the third block satisfies the first preset condition, the fifth node upgrades the blockchain system based on the system upgrade request to update a value of the target parameter type of the blockchain system to the parameter value, and broadcasts any one or more of the value of the target parameter type of the upgraded blockchain system, a system status and the voting signature of at least one parameter manager for the system upgrade request to the blockchain system

Fig. 3

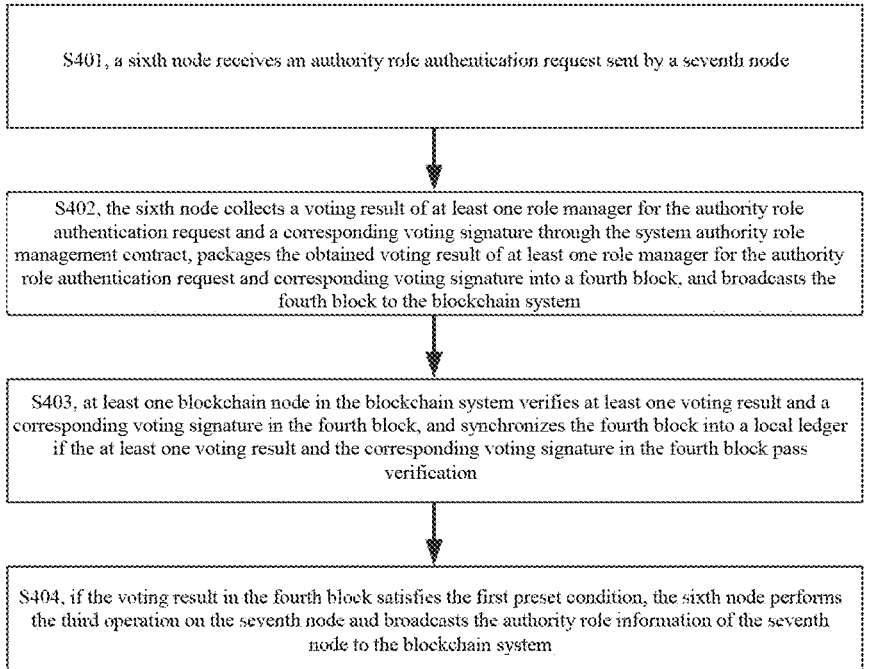

S401, a sixth node receives an authority role authentication request sent by a seventh node S402, the sixth node collects a voting result of at least one role manager for the authority role authentication request and a corresponding voting signature through the system authority role management contract, packages the obtained voting result of at least one role manager for the authority role authentication request and corresponding voting signature into a fourth block, and broadcasts the fourth block to the blockchain system S403, at least one blockchain node in the blockchain system verifies at least one voting result and a corresponding voting signature in the fourth block, and synchronizes the fourth block into a local ledger if the at least one voting result and the corresponding voting signature in the fourth block pass verification S404, if the voting result in the fourth block satisfies the first preset condition, the sixth node performs the third operation on the seventh node and broadcasts the authority role information of the seventh node to the blockchain system

Fig. 4

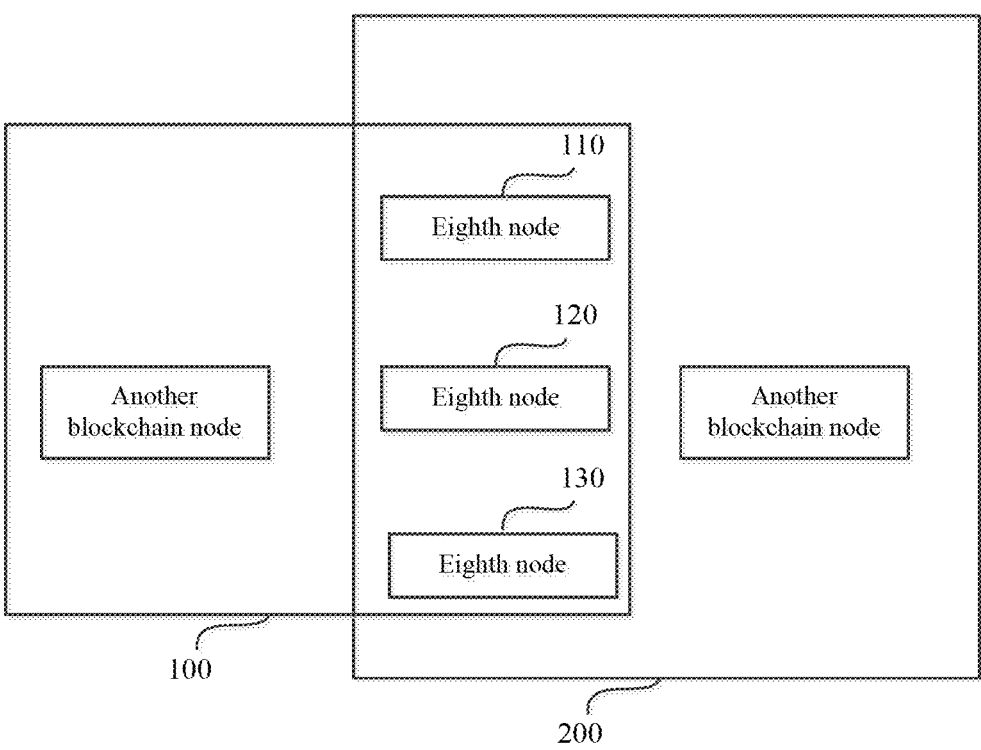

110

Eighth node

120

Eighth node

130

Eighth node

Another blockchain node

Another blockchain node

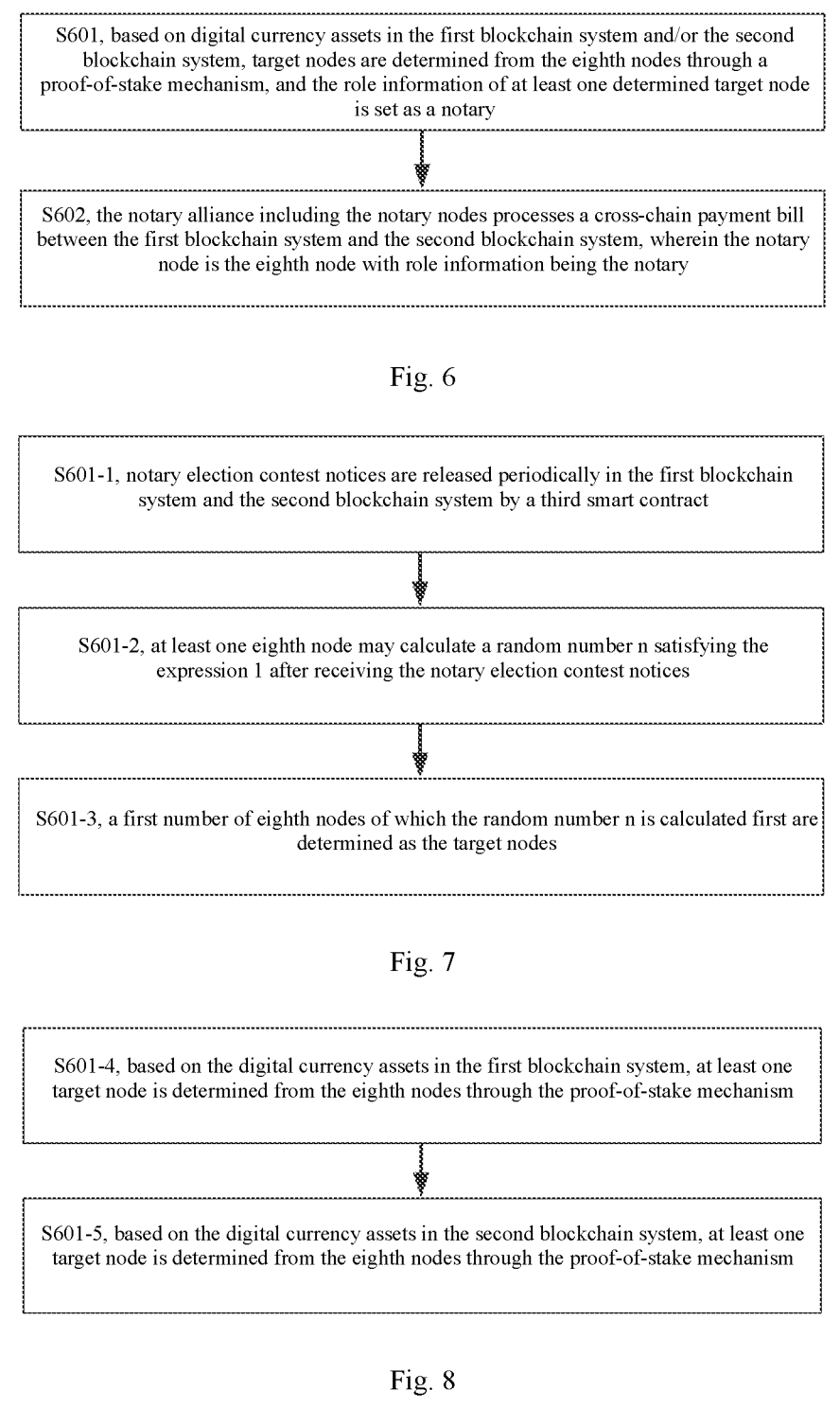

S601, based on digital currency assets in the first blockchain system and/or the second blockchain system, target nodes are determined from the eighth nodes through a proof-of-stake mechanism, and the role information of at least one determined target node is set as a notary S602, the notary alliance including the notary nodes processes a cross-chain payment bill between the first blockchain system and the second blockchain system, wherein the notary node is the eighth node with role information being the notary

Fig. 6

S601-1, notary election contest notices are released periodically in the first blockchain system and the second blockchain system by a third smart contract S601-2, at least one eighth node may calculate a random number n satisfying the expression 1 after receiving the notary election contest notices S601-3, a first number of eighth nodes of which the random number n is calculated first are determined as the target nodes

Fig. 7

S601-4, based on the digital currency assets in the first blockchain system, at least one target node is determined from the eighth nodes through the proof-of-stake mechanism S601-5, based on the digital currency assets in the second blockchain system, at least one target node is determined from the eighth nodes through the proof-of-stake mechanism

Fig. 8

S602-1, a first wallet multi-signed by the notary nodes is generated in the first blockchain system, and a second wallet multi-signed by the notary nodes is generated in the second blockchain system

S602-2, when at least one notary node detects the generation of a first bill for digital currency asset transfer to the first wallet, second assets corresponding to the amount of the first assets recorded in the first bill are activated in the second wallet, a second bill multi-signed by the notary nodes is generated in the second blockchain system, and the second assets are transferred to an asset receiving address designated by a client in the second blockchain system

S602-3, when at least one notary node detects that a third bill for digital currency asset transfer to the second wallet is generated, the third bill is associated with the second bill, and the digital currency assets transferred in the third bill match with the second assets, a fourth bill multi-signed by the notary nodes and associated with the first bill is generated in the first blockchain system, and the first assets are transferred to an asset receiving address designated by the client in the first blockchain system

Fig. 9

S602-4, when the target nodes are determined, a first smart contract pre-deployed in the first blockchain system is activated, and a client that needs to transfer digital currency assets from the first blockchain system to the second blockchain system is informed through the first smart contract to configure an asset receiving address for paying bills as the first wallet preset in the first blockchain system

S602-5, when the first bill for digital currency asset transfer to the first wallet is detected through the first smart contract, the first bill is verified in the notary alliance by triggering the practical Byzantine fault tolerance mechanism and a verification result is announced to the second blockchain system

S602-6, after detecting that verification of the first bill in the notary alliance is completed through a second smart contract pre-deployed in the second blockchain system, second assets corresponding to the amount of the first assets recorded in the first bill are activated in a preset second wallet of the second blockchain system, a second bill is generated in the second blockchain system, and the second assets are transferred to the asset receiving address designated by the client in the second blockchain system

S602-7, when it is detected through the second smart contract that a third bill for digital currency asset transfer to the second wallet is generated, the third bill is associated with the second bill, and digital currency assets transferred in the third bill match with the second assets, the third bill is verified in the notary alliance by triggering the practical Byzantine fault tolerance mechanism and a verification result is announced to the first blockchain system

S602-8, when it is detected through the first smart contract that the verification of the third bill is completed in the notary alliance, a fourth bill associated with the first bill is generated in the first blockchain system, and the first assets are transferred to the asset receiving address designated by the client in the first blockchain system

Fig. 10

METHOD, BLOCKCHAIN SYSTEM, APPARATUS, PROGRAM, AND MEDIUM FOR BLOCKCHAIN AUTHORITY MANAGEMENT

This application is the U.S. national phase of PCT Application No. PCT/CN2022/097227 filed on Jun. 6, 2022, which claims priority to Chinese Patent Application No. CN 202111297102.0, filed on Nov. 4, 2021, entitled "Method and Blockchain System for Blockchain Authority Management", the disclosures of which are hereby incorporated in their entirety by reference herein.

TECHNICAL FIELD

The disclosure relates to a technical field of blockchains, and for example relates to a method, a blockchain system, an electronic apparatus, a computer program, and a computer-readable medium, for blockchain authority management.

BACKGROUND

Blockchain technology is a ledger-based technology jointly maintained by multiple parties, which involves a combination of multiple technologies, such as consensus mechanisms, cryptographic algorithms, network routing, and contract scripts, and for example features distributed trust, tampering resistance and multi-party maintenance. These technical features make the blockchain technology considered as one of the most revolutionary technologies since the popularity of the Internet, and highly valued all over the world.

A centralized certificate authority (CA) server is usually required by consortium blockchain for authority control, reliability brought naturally by a distributed trust mechanism of blockchain is reduced, and openness of public blockchains encourages illegal transactions.

SUMMARY

The embodiments of the disclosure disclose a method, a blockchain system, an electronic apparatus, a computer program, and a computer-readable medium, for blockchain authority management.

According to an aspect of the embodiments of the disclosure, disclosed is a method for blockchain authority management, which is applied to a blockchain system. The method comprises:

receiving, by a first node, a node operation request for a second node, the first node being a blockchain node in the blockchain system with role information being a node manager, and a node type of the second node including any one or more of a super node, a backbone node, and a service node;

voting, by the first node, on the node operation request, the node operation request comprising any one or more of a first contract name to be called, the node type of the second node, a first operation, and a submission account, the first contract name being a name of a system node management contract in the blockchain system, the system node management contract being deployed on the blockchain node in the blockchain system with the role information being the node manager, and the first operation being an operation to be executed for the second node;

sending, by the first node, a first voting request to another node manager in the blockchain system, the first voting request requesting the node manager to vote on the node operation request;

obtaining, by the first node, a voting result of the node manager on the node operation request and a voting signature corresponding to the voting result, packaging the obtained voting result and voting signature into a first block, and broadcasting the first block to the blockchain system;

verifying, by at least one blockchain node in the blockchain system, at least one voting result and a corresponding voting signature in the first block, and synchronizing the first block into a local ledger in a case where the at least one voting result and the corresponding voting signature in the first block pass verification;

responding, by the first node, to the node operation request in a case where the voting result in the first block satisfies a first preset condition with a number of votes passed greater than a first preset number threshold;

sending, by the second node, a second voting request to a chain creator in the blockchain system in a case where the first operation is a creating operation, the second voting request comprising role information of the second node and requesting the chain creator to vote on the role information of the second node; and collecting, by a target chain creator in the blockchain system, a voting result of the chain creator on the role information of the second node and a corresponding voting signature, and setting the role information of the second node in the blockchain system based on the voting result in a case where the voting result and the corresponding voting signature for the role information of the second node pass verification.

According to another aspect of the embodiments of the disclosure, disclosed is a blockchain system comprising a first node, the first node being a blockchain node in the blockchain system with role information being a node manager, wherein the first node is configured to:

receive a node operation request for a second node, the node type of the second node including any one or more of a super node, a backbone node, and a service node:

vote on the node operation request, the node operation request comprising any one or more of a first contract name to be called, the node type of the second node, a first operation, and a submission account, the first contract name being a name of a system node management contract in the blockchain system, the system node management contract being deployed on the blockchain node in the blockchain system with the role information being the node manager, and the first operation being an operation to be executed for the second node: send a first voting request to another node manager in the blockchain system, the first voting request requesting the node manager to vote on the node operation request; and obtain a voting result of the node manager on the node operation request and a voting signature corresponding to the voting result, package the obtained voting result and voting signature into a first block, and broadcast the first block to the blockchain system;

wherein at least one blockchain node is configured to:

verify at least one voting result and a corresponding voting signature in the first block, and synchronize the first block into a local ledger in a case where the at least one voting result and the corresponding voting signature in the first block pass verification;

wherein the first node is configured to respond to the node operation request in a case where the voting result in the first block satisfies a first preset condition with a number of votes passed greater than a first preset number threshold;

wherein the second nodes is configured to:

send a second voting request to a chain creator in the blockchain system in a case where the first operation is a creating operation, the second voting request comprising role information of the second node and requesting the chain creator to vote on the role information of the second node; and wherein a target chain creator in the blockchain system is configured to collect a voting result of the chain creator on the role information of the second node and a corresponding voting signature, and to set the role information of the second node in the blockchain system based on the voting result in a case where the voting result and the corresponding voting signature for the role information of the second node pass verification.

According to yet another aspect of the embodiments of the disclosure, disclosed is an electronic apparatus comprising:

a memory storing executable instructions; and one or more processors communicating with the memory to execute the executable instructions so as to implement operations in the method of any of the above embodiments of the disclosure.

According to still another aspect of the embodiments of the disclosure, disclosed is an electronic apparatus comprising the blockchain system of any embodiment of the disclosure.

According to yet another aspect of the embodiments of the disclosure, disclosed is an electronic apparatus comprising:

a processor and the blockchain system of any embodiment of the disclosure; and wherein circuits in the blockchain system of any embodiment of the disclosure operate when the blockchain system is run by the processor.

According to yet another aspect of the embodiments of the disclosure, disclosed is a computer program comprising computer instructions, wherein the processor implements operations in the method described in any of the above embodiments of the disclosure when the computer instructions are run in a processor of an apparatus.

According to still another aspect of the embodiments of the disclosure, disclosed is a computer-readable medium for storing computer-readable instructions which, when being executed, implement operations of in the method of any of the above embodiments of the disclosure.

According to the method, the blockchain system, the electronic apparatus, the computer program, and the computer-readable medium for blockchain authority management disclosed in the embodiments of the disclosure, a natural distributed trust mechanism of the blockchain system is utilized to realize flexible authority management, thus realizing higher credibility than centralized CA. Compared with the public blockchain, the mechanism of authority management is adopted rather than full openness, so that illegal transactions may be better avoided.

The technical solution of the disclosure will be described in further detail with reference to the drawings and embodiments.

BRIEF DESCRIPTION OF THE DRAWINGS

The accompanying drawings, which form a part of the specification, illustrate embodiments of the disclosure, and together with the description, serve to explain the principles of the disclosure.

The disclosure can be more clearly understood from the following detailed description with reference to the accompanying drawings. Obviously, the drawings in the following description are only some embodiments of the disclosure. For those of ordinary skilled in the art, other drawings can be obtained according to these drawings without creative labors.

FIG. 1 is a flowchart of a method for blockchain authority management according to an embodiment of the disclosure.

FIG. 2 is a flowchart of a method for blockchain authority management according to another embodiment of the disclosure.

FIG. 3 is a flowchart of a method for blockchain authority management according to yet another embodiment of the disclosure.

FIG. 4 is a flowchart of a method for blockchain authority management according to still another embodiment of the disclosure.

FIG. 5 is a structural diagram of an architecture relationship between a first blockchain system and a second blockchain system according to an embodiment of the disclosure.

FIG. 6 is a flowchart of a method for blockchain authority management according to still another embodiment of the disclosure.

FIG. 7 is a flowchart of sub-steps of step S601 shown in FIG. 6.

FIG. 8 is another flowchart of sub-steps of step S601 shown in FIG. 6.

FIG. 9 is a flowchart of sub-steps of step S602 shown in FIG. 6.

FIG. 10 is another flowchart of sub-steps of step S602 shown in FIG. 6.

DETAILED DESCRIPTION

Figure 11:
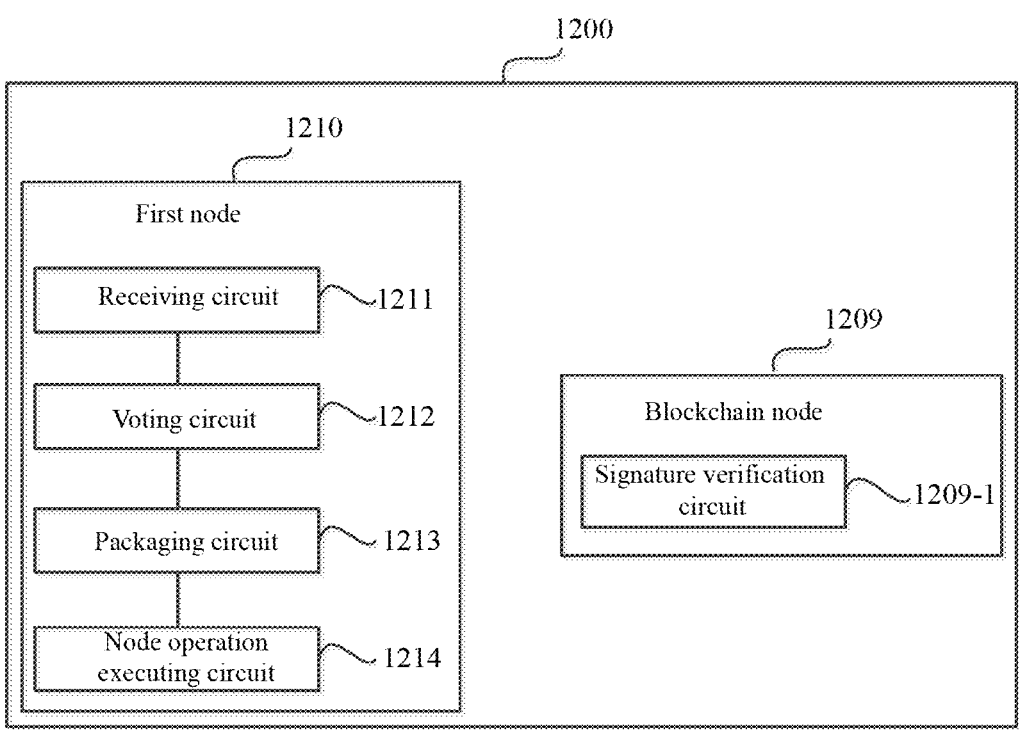
FIG. 11 is a structural diagram of a blockchain system according to an embodiment of the disclosure.

Various exemplary embodiments of the disclosure will now be described in detail with reference to the accompanying drawings. It is noted that the relative arrangements, numerical expressions and numerical values of components and steps set forth in these embodiments do not limit the scope of the disclosure unless otherwise specified.

It is also understood that in the embodiments of the disclosure, "a plurality of" may refer to two or more, and "at least one" may refer to one, two, or more.

It can be understood by those skilled in the art that terms such as "first" and "second" in the embodiments of this disclosure are only used to distinguish different steps, devices, or circuits, and do not represent any specific technical meaning or their inevitable logical order.

It is also understood that any component, data or structure mentioned in the embodiments of the disclosure can generally be understood as one or more components, data or structures unless explicitly defined or given contrary enlightenment in the context.

It is also understood that the description of various embodiments in this disclosure focuses on the differences among various embodiments, and the same or similar parts may serve as references for each other, and will not be repeated for the sake of brevity.

Meanwhile, it is understood that for convenience of description, the dimensions of various parts shown in the drawings are not drawn according to the actual proportional relationship.

The description of at least one exemplary embodiment below is only illustrative, and in no way should it be taken as any limitation on the disclosure, its application or uses.

Technologies, methods and apparatuses known to ordinary skilled in the art may not be discussed in detail, but in appropriate cases, they should be regarded as a part of the specification.

It is noted that similar reference numerals and letters indicate similar items in the following figures, so once an item is defined in one figure, it will not be further discussed in the following figures.

In addition, the term "and/or" herein is only an association relationship describing the associated objects, which means that there may be three kinds of relationships, for example, A and/or B may mean A alone, A and B, and B alone. In addition, the character "/" herein generally indicates that the two associated objects are in an "or" relationship.

The embodiments of the disclosure may be applied to electronic apparatuses such as terminal apparatuses, computer systems, servers, and the like, which can be operated together with many other general-purpose or special-purpose computing system environments or configurations. Examples of well-known terminal apparatuses, computing systems, environments and/or configurations suitable for use with terminal apparatuses, computer systems, servers and other electronic apparatuses include, but are not limited to, personal computer systems, server computer systems, thin clients, thick clients, handheld or laptop equipment, microprocessor-based systems, set-top boxes, programmable consumer electronics, network personal computers, small computer systems, mainframe computer systems and distributed cloud computing technology environments including any of the above systems.

Terminal apparatuses, computer systems, servers and other electronic apparatuses can be described in the general context of computer system executable instructions (such as program modules) executed by computer systems. Generally, program modules may include routines, programs, object programs, components, logic, data structures, etc., which perform particular tasks or implement particular abstract data types. Computer systems/servers can be implemented in a distributed cloud computing environment where tasks are performed by remote processing apparatuses linked through a communication network. In the distributed cloud computing environment, program modules may be located on local or remote computing system storage media including storage apparatuses.

Firstly, a blockchain system in an embodiment of the disclosure is introduced. The blockchain system in the embodiment of the disclosure is initially provided with six roles and four system management smart contracts. The six roles include a chain creator, a node manager, a contract manager, a parameter manager, a role manager and an ordinary user. The four system management smart contracts include a system node management contract, a system contract management contract, a system parameter management contract and a system authority role management contract.

In this embodiment of the disclosure, the chain creator (also a chain manager), may be determined through voting by blockchain nodes in the blockchain system, and the chain creators form a committee for managing the node manager, the contract manager, the parameter manager and the role manager. For example, the update of a list of the aforementioned four managers may be managed through an internal voting by the committee.

Optionally, a data structure of the chain creator may be shown in the following Table 1.

TABLE 1

| Chain_Manager | | |
| --- | --- | --- |
| Fields | Types | Descriptions |
| Account | string | Account address |
| ID | string | User ID |
| Publickey | string | Public key |
| num | string | Block storage location |
| status | string | Status |

In above Table 1, Chain_Manager represents a chain manager, string represents that data in a corresponding field is of a string type, and the above-mentioned block storage location represents a storage location in a blockchain for information on the chain creator.

The node manager is configured to update the system node management contract, and to vote on a node operation request. That is, the node manager has a voting authority to review and eliminate a node. In this embodiment, a data structure of the node manager may be shown in the following Table 2.

TABLE 2

| Node_Manager | | |
| --- | --- | --- |
| Fields | Types | Descriptions |
| Account | string | Account address |
| ID | string | User ID |
| Publickey | string | Public key |
| num | string | Block storage location |
| status | string | Status |

In above Table 2, Node_Manager represents a node manager, and the block storage location represents a storage location in a blockchain for information on the node manager.

The contract manager is configured to update the system contract management contract in the blockchain system and to vote on a contract review request for any smart contract in the blockchain system. A data structure of the contract manager may be shown in the following Table 3.

TABLE 3

| Contract_Manager | | |
| --- | --- | --- |
| Fields | Types | Descriptions |
| Account | string | Account address |
| ID | string | User ID |
| Publickey | string | Public key |
| num | string | Block storage location |
| status | string | Status |

In the above Table 3, Contract_Manager represents a contract manager, and the block storage location represents a storage location in the blockchain for information on the contract manager.

The parameter manager is configured to update the system parameter management contract in the blockchain system and to vote on a system upgrade request. A data structure of the parameter manager may be shown in the following Table 4.

TABLE 4

| Parameter_Manager | | |
| --- | --- | --- |
| Fields | Types | Descriptions |
| Account | string | Account address |
| ID | string | User ID |
| Publickey | string | Public key |
| num | string | Block storage location |
| status | string | Status |

In the above Table 4, Parameter_Manager represents a parameter manager, and the block storage location represents a storage location in the blockchain for information on parameter manager.

The role manager is configured to update the system authority role management contract in the blockchain system and to vote on a node authority role authentication request. A data structure of the role manager may be shown in the following Table 5.

TABLE 5

| Role_Manager | | |
| --- | --- | --- |
| Fields | Types | Descriptions |
| Account | string | Account address |
| ID | string | User ID |
| Publickey | string | Public key |
| num | string | Block storage location |
| status | string | Status |

In the above Table 5, Role_Manager represents a role manager, and the block storage location represents a storage location in the blockchain for information on the role manager.

The ordinary user is configured to release transactions and smart contracts in the blockchain system, and it can be understood that at least one ordinary user has a unique user ID. A data structure of the ordinary user is shown in the following Table 6.

TABLE 6

| User_Manager | | |
| --- | --- | --- |
| Fields | Types | Descriptions |
| Account | string | Account address |
| ID | string | User ID |
| Publickey | string | Public key |
| num | string | Block storage location |
| status | string | Status |

In the above Table 6 above, User_Manager represents a user manager, that is, an ordinary user. The block storage location represents a storage location in the blockchain for the information on a corresponding ordinary user.

The above four system management smart contracts will be introduced through method steps below.

FIG. 1 is a flowchart of a method for blockchain authority management according to an embodiment of the disclosure. The method for blockchain authority management described in the embodiment of FIG. 1 may be applied to the blockchain system in the embodiment of the disclosure. Referring to FIG. 1, the method for blockchain authority management of this embodiment may comprise the following steps.

In S101, a first node receives a node operation request for a second node, wherein the first node is a blockchain node in the blockchain system with role information being a node manager, and a node type of the second node include any one or more of a super node, a backbone node and a service node.

For example, there may be multiple node managers in the blockchain system, and the first node is one of the multiple node managers. The second node may be a blockchain node in the blockchain system, and the node operation request may be used to request the node manager in the blockchain system to update, delete or report the second node. In addition, the second node may also be a node outside the blockchain system, and the node operation request may be used to request the node manager in the blockchain system to create the second node.

Optionally, the node operation request may include information submitted for calling the system node management contract, for example including any one or more of a first contract name to be called, the node type of the second node, a first operation and a submission account, for example as shown in the following Table 7.

TABLE 7

| Submission information | | |
| --- | --- | --- |
| Fields | Types | Descriptions |
| Contract_name | string | First contract name |
| Node_type | string | Node type |
| Node_operate | string | First operation |
| Address | string | Submission account |

It is noted that the system node management contract is deployed on at least one blockchain node in the blockchain system with the role information being the node manager, in other words, the system node management contract is deployed on at least one node manager.

In the above Table 7, the first contract name is a name of the system node management contract in the blockchain system. The first operation is an operation to be executed by the second node. It can be understood that when the operation to be executed is a creating operation, a deleting operation or an updating operation, the node operation request may be sent by the second node to the first node. When the operation to be executed is a reporting operation, the node operation request is usually sent to the first node by another node (a blockchain node or a non-blockchain node) other than the second node.

Correspondingly, S101 may be implemented by:

sending, by the first node, a first voting request to the another node manager through the system node management contract deployed on the node, wherein the another node manager is configured to vote on the node operation request through the system node management contract.

In an optional example, the operation S101 may be executed by a processor by calling corresponding instructions stored in the memory, or by a receiving circuit in the first node controlled by the processor.

In S102, the first node votes on the node operation request.

In an embodiment, the first node (as a node manager) may provide a voting result and a corresponding voting signature for the node operator.

In an optional example, the operation S102 may be executed by a processor by calling corresponding instructions stored in the memory, or by a voting circuit in the first node controlled by the processor.

In S103, the first node sends a first voting request to another node manager in the blockchain system, the first voting request requesting the node manager to vote on the node operation request.

It can be understood that in this embodiment, there is no restriction on an execution order of S102 and S103, that is, they may be executed in any order or concurrently.

The another node manager refer to a node manager in the blockchain system other than the first node. The first voting request also carries any one or more of the first contract name to be called, the node type of the second node, the first operation and the submission account. When the another node manager receive the first voting request, the information in the first voting request may be reviewed, and if the review of the information in the first voting request passes, a voting result indicating the passing and a voting signature for the voting result may be fed back; and if the review of the information in the first voting request fails, a voting result indicating the failure and a voting signature for the voting result may be fed back.

In an optional example, the operation S103 may be executed by a processor by calling corresponding instructions stored in the memory, or by a voting circuit in the first node controlled by the processor.

In S104, the first node obtains the voting result of the node manager on the node operation request and the voting signature corresponding to the voting result, packages the obtained voting result and voting signature into a first block, and broadcasts the first block to the blockchain system.

The node managers here include the first node itself and the another node manager.

In an optional example, the operation S104 may be executed by a processor by calling corresponding instructions stored in the memory, or by a packaging circuit in the first node controlled by the processor.

In S105, at least one blockchain node in the blockchain system verifies at least one voting result and a corresponding voting signature in the first block, and synchronizes the first block into a local ledger in a case where the at least one voting result and the corresponding voting signature in the first block pass the verification.

In this embodiment, the verification by the blockchain node for the voting result may be whether the voting result is data in a preset format, that is, whether it indicates one of pass or failure. The verification by the blockchain node for the voting signature may be verifying the voting signature provided by the corresponding node manager through a public key of the node manager. It is noted that the blockchain node may verify information in a block header of the first block in addition to the voting result and the voting signature in the first block.

The local ledger refers to a blockchain copy maintained on the blockchain node. In a case where the voting result and voting signature in the first block pass the verification of a blockchain node and where the block header of the first block also passes the verification of the blockchain node, the blockchain node may add the first block to an end of the blockchain copy maintained locally.

In an optional example, the operation S105 may be executed by a processor by calling corresponding instructions stored in the memory, or by a signature verification circuit in the first node controlled by the processor.

In S106, the first node responds to the node operation request in a case where the voting result in the first block satisfies a first preset condition with a number of votes passed being greater than a first preset number threshold. It is noted that the disclosure does not limit the first preset number threshold, which may be, for example, a half or three quarters of the number of voting results.

For example, after the first block passes the verification, the number of voting results indicating passing may be counted. If the number of voting results indicating passing accounts for more than half of a total number of voting results in the first block, it may be determined that the node operation request is allowed to be executed on the second node. In this case, the first node may respond to the node operation request.

Through the above design, a comprehensive mechanism for node operation management is provided in the blockchain system, and the mechanism has certain distributed aspects, which is better decentralized compared with a consortium blockchain and may better avoid illegal transactions compared with a public blockchain.

Optionally, the above S106 may be implemented for example by:

performing, by the first node, the first operation on the second node through the system node management contract, and broadcasting the node information on the second node into the blockchain.

The above-mentioned node information on the second node includes any one or more of the node type, node name, node address, role information and node status of the second node, and the voting signature of at least one node manager for the node operation request, for example, as shown in Table 8 below.

TABLE 8

| Node information | | |
| --- | --- | --- |
| Fields | Types | Descriptions |
| Node_type | string | Node type (for example, a super node, a backbone node, a service node) |
| Node_name | string | Node name |
| Node_Address | string | Node address |
| Node_Information | string | Role information |
| Status | string | Node status (0 representing "invalid", 1 representing "valid") |
| Signature_Sum | string | Voting signature set |

In the above Table 8, voting signature set (Signature_sum) is a set including voting signatures for the node operation request by the node manager. The role information of the second node may be any of the six roles mentioned above.

It is easy to understand that the first operation comprises any one or more of a creating operation, an updating operation, a deleting operation or a reporting operation. When the first operation in the node operation request is the creating operation or the updating operation, the node status of the second node may be valid. When the first operation is the deleting operation or the reporting operation, the node status of the second node may be invalid. This embodiment has no limitation on this.

In an optional example, the operation S106 may be executed by a processor by calling corresponding instructions stored in the memory, or by a node operation executing circuit in the first node controlled by the processor.

In an optional example, the sending, by the first node, the first voting request to another node manager in the blockchain system in S103 may be implemented for example by:

sending, by the first node, a first voting request to the another node manager through the system node management contract, the another node manager being configured to vote on the node operation request through the system node management contract.

The sending, by the first node, the first voting request to the another node manager in the blockchain system may be executed by a processor by calling a corresponding instruction stored in the memory, or by a voting circuit in the first node controlled by the processor.

In S107, the second node send a second voting request to a chain creator in the blockchain system when the first operation is a creating operation, wherein the second voting request includes the role information of the second node and is used for requesting the chain creator to vote on the role information of the second node.

The role information of the second node includes any one or more of a chain creator, a node manager, a contract manager, a parameter manager, a role manager and an ordinary user. The chain creator is determined by voting by blockchain nodes in the blockchain system, and is configured to manage the node manager, the contract manager, the parameter manager and the role manager: the node manager is configure to update the system node management contract and to vote on the node operation request: the contract manager is configured to update the system contract management contract in the blockchain system and to vote on a contract review request for any smart contract in the blockchain system: the parameter manager is configured to update the system parameter management contract in the blockchain system and to vote on a system upgrade request; the role manager is configured to update the system authority role management contract in the blockchain system and to vote on a node authority role authentication request; and the ordinary user is configure to release transactions and smart contracts in the blockchain system.

In an optional example, the operation S107 may be executed by a processor by calling corresponding instructions stored in the memory, or by a voting circuit in the second node controlled by the processor.

In S108, a target chain creator in the blockchain system collects a voting result of the chain creator for the role information of the second node and a corresponding voting signature, and sets the role information of the second node in the blockchain system based on the voting result in a case where the voting result and the corresponding voting signature for the role information of the second node pass the verification.

As mentioned above, the chain creator has an authority to manage the node manager, the contract manager, the parameter manager and the role manager, and may update the list of these four managers through an internal voting mechanism.

Therefore, in this embodiment, in a case where the role information of the second node is one of the above-mentioned node manager, contract manager, parameter manager and role manager, the second node may perform S601 and S602 to implement a corresponding management for the role information of the second node.

Optionally, in S108, the setting the role information of the second node in the blockchain system based on the voting result may be implemented by:

if the role information of the second node includes any one or more of a node manager, a contract manager, a parameter manager and a node role manager, and the voting result for the role information of the second node satisfies a first preset condition, the role information of the second node is updated to a corresponding manager list in the blockchain system.

In an optional example, S108 may be performed by a processor by calling corresponding instructions stored in the memory.

Based on the embodiment in FIG. 1, as an optional implementation, referring to FIG. 2, the method for blockchain authority management may further comprise the following steps.

In S201, a third node determines a smart contract to be operated, and sends a contract review request for the smart contract to be operated to the contract manager in the blockchain node.

The third node is a blockchain node in the blockchain system with role information being an ordinary user.

The contract review request includes information submitted by the third node for calling the system contract management contract, and for example, may include any one or more of a second contract name to be called, a contract type of the smart contract to be operated, a contract content of the smart contract to be operated, a second operation and an account of the third node, as shown in Table 9 below.

TABLE 9

| Submission information | | |
|---|---|---|
| Fields | Types | Descriptions |
| Contract_name | string | Second contract name |
| Contract_type | string | Contract type |
| Contract_content | string | Contract content |
| Contract_operate | string | Second operation |
| Address | string | Submission account |

In the above Table 9, the second contract name is a name of the system contract management contract in the blockchain system, representing a smart contract which needs to be called to process the contract review request. The contract type refers to the contract type of the smart contract to be operated, for example, it may be a financial-related smart contract or a security-related smart contract.

The second operation is an operation to be executed for the smart contract to be operated, which may be a creating operation, an updating operation, a deleting operation or a reporting operation. The account of the third node is a submission account of the contract review request.

In an optional example, S201 may be executed by a processor by calling corresponding instructions stored in the memory, or may be executed by a contract review request circuit in the third node controlled by the processor.

In S202, a fourth node collects a voting result of at least one the contract manager for the contract review request and a corresponding voting signature through the system contract management contract, packages the obtained voting result of the at least one contract manager for the contract review request and the corresponding voting signature into a second block, and broadcasts the second block to the blockchain system.

The fourth node is a blockchain node in the blockchain system with role information being the contract manager. For example, there may be multiple contract managers in the blockchain system, and the fourth node is one of the multiple contract managers. At least one contract manager in S302 may include the fourth node itself and another contract manager other than the fourth node.

It can be seen that the system contract management contract in the blockchain system has an authority to review or eliminate the smart contract in the blockchain system.

In an optional example, S202 may be executed by a processor by calling corresponding instructions stored in the memory, or may be executed by a contract review circuit in the fourth node controlled by the processor.

In S203, at least one blockchain node in the blockchain system verifies at least one voting result and a corresponding voting signature in the second block, and synchronizes the second block into a local ledger if the at least one voting result and the corresponding voting signature in the second block pass verification.

Detailed descriptions for S105 above may be referred to for an implementation of S203 due to similar principles, which will not be repeated here.

In an optional example, the operation S203 may be executed by a processor by calling corresponding instructions stored in the memory, or by a signature verification circuit in the fourth node controlled by the processor.

In S204, if the voting result in the second block satisfies the first preset condition, the fourth node performs the second operation on the smart contract to be operated, and broadcasts the contract information of the smart contract to be operated to the blockchain system.

The contract information of the smart contract to be operated may include any one or more of a contract type, a contract name, a contract address, a contract function description and a contract status of the smart contract to be operated and a voting signature by the contract manager for the contract review request, as shown in Table 10 below.

TABLE 10

| Contract information | | |
| --- | --- | --- |
| Fields | Types | Descriptions |
| Contract_type | string | Contract type |
| Contract_name | string | Contract name |
| Contract_Address | string | Contract address |
| Contract_Information | string | Role information |
| Status | string | Contract status (0 representing "invalid", 1 representing "valid") |
| Signature_Sum | string | Voting signature set |

It can be understood that in the above Table 10, Signature_Sum is a set including voting signatures of the contract managers for the contract review request.

In an optional example, S204 may be executed by a processor by calling corresponding instructions stored in the memory, or may be executed by a contract operation circuit in the fourth node controlled by the processor.

Based on the embodiment in FIG. 1 and/or the implementation in FIG. 2, as an optional implementation, referring to FIG. 3, the method for blockchain authority management may further comprise the following steps.

In S301, a fifth node receives a system upgrade request sent by the chain creator in the blockchain system.

The fifth node is a blockchain node in the blockchain system with role information being a parameter manager. For example, there are multiple parameter managers in the blockchain system, and the fifth node is one of the multiple parameter managers.

The system upgrade request may include information submitted by the fifth node for calling the system parameter management contract, and for example include any one or more of a third contract name to be called, a target parameter type to be adjusted, a parameter value and an account of the chain creator sending the system upgrade request, as shown in Table 11 below.

TABLE 11

| Submission information | | |
| --- | --- | --- |
| Fields | Types | Descriptions |
| Contract_name | string | Third contract name |
| Parameter_type | string | Parameter type |
| Parameter_content | string | Parameter value |
| Address | string | Submission account |

In the above Table 11, the third contract name is a contract name of the system parameter management contract in the blockchain system. The parameter type refers to a parameter type to be updated, which may include, for example, block limit, transaction limit, etc. The system parameter management contract is deployed on a blockchain node in the blockchain system with role information being the parameter manager.

In an optional example, the operation S301 may be executed by a processor by calling corresponding instructions stored in the memory, or by a receiving circuit in the fifth node controlled by the processor.

In S302, the fifth node includes a voting result of at least one parameter manager in the blockchain system for the system upgrade request and a corresponding voting signature through the system parameter management contract, packages the obtained voting result and corresponding voting signature into a third block, and broadcasts the third block to the blockchain system. Here, the parameter manager is configured to update the system parameter management contract in the blockchain system and to vote on the system upgrade request.

It is noted that at least one parameter manager in S302 includes the fifth node itself and another parameter manager other than the fifth node. The third block carries the voting result of the parameter manager and the corresponding voting signature.

In an optional example, the operation S302 may be executed by a processor by calling corresponding instructions stored in the memory, or by a parameter updating circuit in the fifth node controlled by the processor.

In S303, at least one blockchain node in the blockchain system verifies at least one voting result and a corresponding voting signature in the third block, and synchronizes the third block into a local ledger if the at least one voting result and the corresponding voting signature in the third block pass verification.

Detailed descriptions for S105 above may be referred to for an implementation of due to similar principles, which will not be repeated here.

In an optional example, the operation S303 may be executed by a processor by calling corresponding instructions stored in the memory, or by a signature verification circuit in the fifth node controlled by the processor.

In S304, if the voting result in the third block satisfies the first preset condition, the fifth node upgrades the blockchain system based on the system upgrade request to update a value of the target parameter type of the blockchain system to the parameter value, and broadcasts any one or more of the value of the target parameter type of the upgraded blockchain system, a system status and the voting signature of at least one parameter manager for the system upgrade request to the blockchain system.

For example, in a case where the target parameter types include block limit and transaction limit, the blockchain parameters may be as shown in the following Table 12.

TABLE 12

| Blockchain parameter | | |
| --- | --- | --- |
| Fields | Types | Descriptions |
| Block__limit | string | Block limit |
| Transaction__limit | string | Transaction limit |
| Status | string | System status (0 representing "invalid", 1 representing "valid") |
| Signature__sum | string | Voting signature set |

In Table 12 above, voting signature set (Signature_sum) is a set including voting signatures of the parameter manager for the system upgrade request.

In an optional example, the operation S304 may be executed by a processor by calling corresponding instructions stored in the memory, or by a system update circuit in the fifth node controlled by the processor.

Referring to the implementation of FIG. 3, it can be seen that the system parameter management contract may be triggered by the chain creator, a voting mechanism is initiated in response to the triggering of the chain creator, and blockchain system upgrade is started based on the voting result.

On the basis of the embodiment in FIG. 1 and/or the implementations in FIGS. 2-3, as an optional implementation, referring to FIG. 4, the method for blockchain authority management may further comprise the following steps.

In S401, a sixth node receives an authority role authentication request sent by a seventh node.

Here, the sixth node is a blockchain node in the blockchain system with role information being a role manager, and the seventh node is an authority node for issuing a certificate.

The authority role authentication request may include information submitted for calling the system authority role management contract, and for example include any one or more of a fourth contract name to be called, a role type of the seventh node, a public key of the seventh node, a third operation and an account of the seventh node, the fourth contract name being a name of the system authority role management contract in the blockchain system, as shown in Table 13 below.

TABLE 13

| Submission information | | |
| --- | --- | --- |
| Fields | Types | Descriptions |
| Contract__name | string | Fourth contract name |
| Role__type | string | Role type |
| Publickey | string | Public key |
| Operate | string | Third operation |
| Address | string | Submission account |

It can be understood that the system authority role management contract is deployed on the blockchain node in the blockchain system with role information being the role manager. The third operation is an operation to be executed for the seventh node, which, for example, may be a creating operation, an updating operation, a reporting operation or a deleting operation. The role type of the seventh node may be, for example, a financial node, a school node, a quality inspection node, etc., which is not limited by his embodiment.

In an optional example, the operation S401 may be executed by a processor by calling corresponding instructions stored in the memory, or by an authority role authentication circuit in the sixth node controlled by the processor.

In S402, the sixth node collects the voting result of at least one role manager for the authority role authentication request and a corresponding voting signature through the system authority role management contract, packages the obtained voting result of the at least one role manager for the authority role authentication request and the corresponding voting signature into a fourth block, and broadcasts the fourth block to the blockchain system.

The at least one role manager here may include the sixth node itself and another role manager other than the sixth node.

In an optional example, the operation S402 may be executed by a processor by calling corresponding instructions stored in the memory, or by a voting circuit in the sixth node controlled by the processor.

In S403, at least one blockchain node in the blockchain system verifies at least one voting result and a corresponding voting signature in the fourth block, and synchronizes the fourth block into a local ledger if the at least one voting result and the corresponding voting signature in the fourth block pass verification.

Detailed descriptions for S105 above may be referred to for an implementation of S403, which will not be repeated here.

In an optional example, the operation S403 may be executed by a processor by calling corresponding instructions stored in the memory, or by a signature verification circuit in the sixth node controlled by the processor.

In S404, if the voting result in the fourth block satisfies the first preset condition, the sixth node performs the third operation on the seventh node and broadcasts the authority role information of the seventh node to the blockchain system.

Optionally, the authority role information of the seventh node may include any one or more of a role type of the seventh node, a public key, an address of the account of the seventh node, a role information description of the seventh node, a role status of the seventh node, and the voting signature of at least one role manager for the authority role authentication request. Refer to Table 14 below.

TABLE 14

| Authority role information | | |
| --- | --- | --- |
| Fields | Types | Descriptions |
| Role__type | string | Role type |
| Role__Publickey | string | Public key |
| Role__Address | string | Account address |
| Role__Information | string | Role information |
| Status | string | Role status (0 representing invalid, 1 representing valid) |
| Signature__sum | string | Voting signature set |

In the above Table 14, Role_Address refers to the account address of the seventh node, and the voting signature set (Signature_sum) is a set including the voting signatures of the role managers for the authority role authentication request.

In an optional example, the operation S404 may be executed by a processor by calling corresponding instructions stored in the memory, or by an authority role operation circuit in the sixth node controlled by the processor.

Referring to the implementation of FIG. 4, it can be seen that the system authority role management contract is not equivalent to the super node, backbone node or service node in the blockchain system, but is for role authentication with a supervision function. The role type here may include an authority node such as a financial audit node, a quality inspection node, and a school node. The authority node may be configured to issue a certificate.

In the embodiment of the disclosure, the deploying any of the above-mentioned system management contracts in the blockchain system may be that the chain creator (that is, the chain manager) initializes the system-level contract (any of the above-mentioned four types), a predefined role manager formulates and signs contract rules, and then the obtained system-level contract is deployed on the corresponding blockchain node.

Through the method for blockchain authority management and blockchain system in the embodiments of the disclosure, flexible authority management with a distributed trust mechanism may be realized, thus realizing higher credibility than centralized CA, and may better prevent illegal transactions than completely open public blockchains.

Further, in some scenarios, cross-chain transactions may occur among blockchain systems. A typical cross-chain transaction manner is based on a notary, which involves presetting institutions or nodes with mutual trust for the two blockchain systems where a transaction occurs, and these institutions or nodes form a notary alliance to handle the cross-chain transaction.

In this way, a notary role is added to the cross-chain transaction scenario on the basis of the four node roles in the above embodiments, and method for blockchain authority management disclosed by the disclosure is extended by dynamically determining a notary alliance for two blockchain systems between which a cross-chain transaction occurs.

FIG. 5 is a structural diagram of an architecture relationship between a first blockchain system and a second blockchain system according to an embodiment of the disclosure. As shown in FIG. 5, the blockchain system described in this disclosure may, as a first blockchain system 100, communicate with a second blockchain system 200, and the first blockchain system 100 and the second blockchain system 200 jointly comprise a plurality of eighth nodes (for example, the eighth nodes 110, 120 and 130); that is, the eighth node is a blockchain node belonging to both the first blockchain system 100 and the second blockchain system 200. For example, the eighth nodes 110, 120 and 130 shown in FIG. 5 are the blockchain nodes in both the first blockchain system 100 and the second blockchain system 200.

It is understood that the first blockchain system 100 and the second blockchain system 200 may each comprise other blockchain nodes in addition to the above-mentioned eighth nodes.

In order to dynamically determine the notary alliance of the first blockchain system 100 and the second blockchain system 200, on the basis of the embodiments of FIGS. 1 and 5, as an optional implementation, referring to FIG. 6, the method for blockchain authority management may further comprise the following steps.

In S601, based on digital currency assets in the first blockchain system and/or the second blockchain system, a target node is determined from the plurality of eighth nodes through a proof-of-stake mechanism, and role information of at least one determined target node is set as a notary.

At least one eighth node holds a certain amount of digital currency assets in the first blockchain system 100 and the second blockchain system 200 respectively. For example, at least one eighth node holds a certain amount of first assets in the first blockchain system 100 and a certain amount of second assets in the second blockchain system 200.

In an optional example, S601 may be executed by a processor by calling corresponding instructions stored in the memory, or may be executed by a notary determination circuit controlled by the processor.

On the basis of the implementation of FIG. 6, as an optional example, referring to FIG. 7, S601 may further comprise the following steps.

In S601-1, notary election contest notices are released periodically in the first blockchain system and the second blockchain system by a third smart contract.

In S601-2, at least one eighth node may calculate a random number n satisfying the following expression (1) after receiving the notary election contest notices:

$$H(H(M'_{i-1}), H(M_i), n) < Target * CoinAge \qquad (1)$$

where H represents a hash function, M represents the notary election contest notice, M' represents a notary election contest notice record stored in the eighth node. Correspondingly, $M_i$ represents a currently received notary election contest notice, and $M'_{i-1}$ represents a last notary election contest notice record stored in the eighth node. Target is a preset value, and CoinAge represents a currency age of the eighth node, that is, a product of the number of currency assets currently held by the eighth node and the holding period. For example, the eighth node in this embodiment belongs to both the first blockchain system 100 and the second blockchain system 200, and thus the eighth node may hold digital currency assets in both the first blockchain system 100 and the second blockchain system 200, based on which CoinAge of at least one eighth node may be obtained by the following expression (2):

$$Coin_1 * Age_1 * \alpha_1 + Coin_2 * Age_2 * \alpha_2 \qquad (2)$$

where Coin represents the number of digital currency assets held by the eighth node in the first blockchain system 100, and $Age_1$ represents the holding period of the digital currency assets in the first blockchain system 100 by the eighth node, so $Coin_1 * Age_1$ may represent the currency age of the eighth node in the first blockchain system 100 (called a "first currency age" here). $Coin_2$ represents the number of digital currency assets held by the eighth node in the second blockchain system 200, $Age_2$ represents the holding period of the digital currency assets in the second blockchain system 200 by the eighth node, so $Coin_2 * Age_2$ may represent the currency age of the eighth node in the second blockchain system 200 (called "second currency age" here).

In this embodiment, the first currency age and the second currency age of the eighth node may be configured with weights in advance, with the first currency age corresponding to a first weight (i.e., $\alpha_1$) and the second currency age corresponding to a second weight (i.e., $\alpha_2$). The sum of $\alpha_1$ and $\alpha_2$ is 1, values of which may be set flexibly as required. For example, it may be 0.5; and in another example, the digital currency assets in the first blockchain system 100 and the second blockchain system 200 may be exchanged based on value. According to an exchange relationship between the two digital currency assets, a value ratio between the digital currency assets of the first blockchain system 100 and the digital currency assets of the second blockchain system 200 held by an eighth node may be determined, and the above $\alpha_1$ and $\alpha_2$ may be set according to this value ratio.

For example, the number of the digital currency assets of the second blockchain system 200 held by an eighth node (i.e., $Coin_2$) may be converted to the number of the digital currency assets of the first blockchain system 100 (i.e., $Coin_2'$) according to the value exchange relationship. Then, the sum of the number of the digital currency assets in the first blockchain system 100 held by the eighth node (i.e., $Coin_1$) and $Coin_2'$ is calculated, $\alpha_1$ is set as $Coin_1/(Coin_1+Coin_2')$, and $\alpha_2$ is set as $Coin_2'/(Coin_1+Coin_2')$.

In S601-3, a first number of eighth nodes with the random number n calculated first are determined as the target nodes.

Here, the first number may be the number of preset notary nodes, which is less than or equal to the number of the eighth nodes.

In an optional example, S601-1 to S601-3 may be executed by a processor by calling corresponding instructions stored in the memory, or may be executed by a notary determination circuit controlled by the processor.

On the basis of the implementation of FIG. 6, in another optional example, referring to FIG. 8, S601 may further comprise the following steps.

In S601-4, based on the digital currency assets in the first blockchain system, at least one target node is determined from the plurality of eighth nodes through a proof-of-stake mechanism.

In S601-5, based on the digital currency assets in the second blockchain system, at least one target node is determined from the plurality of eighth nodes through the proof-of-stake mechanism.

The third smart contract may periodically trigger a notary election contest, so that blockchain nodes in the first blockchain system 100 may determine a second number of candidate nodes with the largest currency age from the plurality of eighth nodes through a practical Byzantine fault tolerance mechanism. Similarly, blockchain nodes in the second blockchain system 200 may also determine a second number of candidate nodes from the plurality of eighth nodes.

For example, same nodes among the candidate nodes determined respectively in the first blockchain system 100 and the second blockchain system 200 may be used as the target nodes, wherein the second number is greater than or equal to the first number, but less than or equal to the number of the eighth nodes. In another example, the candidate nodes determined separately in the first blockchain system 100 and the second blockchain system 200 may be determined respectively as the target nodes, wherein the second number is less than or equal to the first number.

It can be understood that in this implementation, the blockchain nodes in the first blockchain system 100 or the second blockchain system 200 may calculate the currency age of digital currency assets held by at least one eighth node through the following expression (3):

$$Coin_1 * Age_1 + Coin_2 * Age_2 \qquad (3)$$

After determining the first number of target nodes through the above optional example, the information representing a notary in the role information of the current notary node may be deleted through the node role management contract described above, that is, the notary qualification of the current notary node is canceled, and then the role information of the first number of target nodes is set as notary, thereby obtaining a first number of new notary nodes.

In an optional example, S601-4 to S601-5 may be executed by a processor by calling corresponding instructions stored in the memory, or may be executed by a notary determination circuit controlled by the processor.

In S602, the notary alliance including the notary nodes processes a cross-chain payment bill between the first blockchain system and the second blockchain system, wherein the notary node refers to the eighth node with role information being the notary.

It can be understood that the notary nodes in S602 may be the first number of notary nodes mentioned above, and the first number of notary nodes form the notary alliance.

The notary alliance may process the cross-chain payment bill between the first blockchain system 100 and the second blockchain system 200.

In an optional example, S602 may be executed by a processor by calling corresponding instructions stored in the memory, or may be executed by a cross-chain transaction circuit controlled by the processor.

On the basis of the implementation of FIG. 6, in another optional example, referring to FIG. 9, S602 may further comprise the following steps.

In S602-1, a first wallet multi-signed by the notary nodes is generated in the first blockchain system, and a second wallet multi-signed by the notary nodes is generated in the second blockchain system.

In S602-2, when at least one notary node detects the generation of a first bill for digital currency asset transfer to the first wallet, second assets corresponding to the amount of the first assets recorded in the first bill are activated in the second wallet, a second bill multi-signed by the notary nodes is generated in the second blockchain system, and the second assets are transferred to an asset receiving address designated by a client in the second blockchain system.

Here, the client may be a client used by the user who initiates a cross-chain payment.

In S602-3, when at least one notary node detects that a third bill for digital currency asset transfer to the second wallet is generated, the third bill is associated with the second bill, and the digital currency assets transferred in the third bill match with the second assets, a fourth bill multi-signed by the notary nodes and associated with the first bill is generated in the first blockchain system, and the first assets are transferred to an asset receiving address designated by the client in the first blockchain system.

In an optional example, S602-1 to S602-3 may be executed by a processor by calling corresponding instructions stored in the memory, or may be executed by a cross-chain transaction circuit controlled by the processor.

On the basis of the implementation of FIG. 6, in another optional example, referring to FIG. 10, S602 may further comprise the following steps.

In S602-4, when the target nodes are determined, a first smart contract pre-deployed in the first blockchain system is activated, and a client that needs to transfer digital currency assets from the first blockchain system to the second blockchain system is informed through the first smart contract to configure an asset receiving address for paying bills as the first wallet preset in the first blockchain system.

In S602-5, when the first bill for digital currency asset transfer to the first wallet is detected through the first smart contract, the first bill is verified in the notary alliance by triggering the practical Byzantine fault tolerance mechanism and a verification result is announced to the second blockchain system.

In S602-6, after detecting that verification of the first bill in the notary alliance is completed through a second smart contract pre-deployed in the second blockchain system, second assets corresponding to the amount of the first assets recorded in the first bill are activated in a preset second wallet of the second blockchain system, a second bill is generated in the second blockchain system, and the second assets are transferred to the asset receiving address designated by the client in the second blockchain system.

In S602-7, when it is detected through the second smart contract that a third bill for digital currency asset transfer to the second wallet is generated, the third bill is associated with the second bill, and digital currency assets transferred in the third bill match with the second assets, the third bill is verified in the notary alliance by triggering the practical Byzantine fault tolerance mechanism and a verification result is announced to the first blockchain system.

In S602-8, when it is detected through the first smart contract that the verification of the third bill is completed in the notary alliance, a fourth bill associated with the first bill is generated in the first blockchain system, and the first assets are transferred to the asset receiving address designated by the client in the first blockchain system.

Through the above design, cross-chain payment transactions between the first blockchain system 100 and the second blockchain system 200 may be realized.

In an optional example, S602-4 to S602-8 may be executed by a processor by calling corresponding instructions stored in the memory, or may be executed by a cross-chain transaction circuit controlled by the processor.

In an optional example, the processing, by the notary alliance including the notary nodes, the cross-chain payment bill between the first blockchain system and the second blockchain system may be implemented by:

detecting whether the notary node exists in a client initiating the cross-chain payment bill between the first blockchain system and the second blockchain system, and not processing the cross-chain bill if the notary node exists in the client initiating the cross-chain payment bill. In this way, the notary node may be prevented from maliciously initiating cross-chain payment transactions and doing evil.

The processing, by the notary alliance including the notary nodes, the cross-chain payment bill between the first blockchain system and the second blockchain system may be executed by a processor by calling corresponding instructions stored in the memory or by a detection circuit controlled by the processor.

It is noted that other cross-chain payment bills which are not initiated by the client with the notary node or received by the client with the notary node may also be handled by the current notary alliance.

Any method for blockchain authority management provided by the embodiments of the disclosure may be executed by any appropriate apparatus with data processing capability, including but not limited to: terminal apparatuses and servers. Alternatively, any method for blockchain authority management provided by the embodiments of the disclosure may be executed by a processor, for example, the processor executes any method for blockchain authority management mentioned by the embodiments of the disclosure by calling corresponding instructions stored in the memory, which will not be repeated below.

One of ordinary skilled in the art may understand that all or a part of the steps for implementing the above method embodiment may be implemented by hardware related to program instructions, the aforementioned program may be stored in a computer readable storage medium, and when being executed, performs the steps included in the above method embodiment; and the aforementioned storage media include various media which may store program codes, such as ROM, RAM, magnetic disk or optical disk.

FIG. 11 is a structural diagram of a blockchain system according to an embodiment of the disclosure. The system of this embodiment may be used to implement the above-mentioned method embodiments of this disclosure. As shown in FIG. 11, the blockchain system 1200 of this embodiment comprises:

a first node 1210 which is a blockchain node in the blockchain system with role information being a node manager, wherein the first node 1210 may comprise a receiving circuit 1211, a voting circuit 1212, a packaging circuit 1213 and a node operation executing circuit 1214. In addition to the first node 1210, the blockchain system 1200 may also comprise other blockchain nodes, for example, the blockchain node 1209 shown in FIG. 12, and the blockchain node 1209 comprises a signature verification circuit 1209-1. The receiving circuit 1211 is configured to receive a node operation request for a second node, and the node type of the second node includes any one or more of a super node, a backbone node and a service node. The voting circuit 1212 is configured to vote on the node operation request and to send a first voting request to another node manager in the blockchain system, wherein the first voting request is configured to request the another node manager to vote on the node operation request. The packaging circuit 1213 is configured to obtain a voting result of the node manager for the node operation request and a voting signature corresponding to the voting result, to package the obtained voting result and voting signature into a first block, and to broadcast the first block to the blockchain system. The signature verification circuit of at least one blockchain node in the blockchain system 1200 (such as the signature verification circuit 1209-1 in the blockchain node 1209) is configured to verify at least one voting result and the corresponding voting signature in the first block, and to synchronize the first block is d into a local ledger in a case where the at least one voting result and the corresponding voting signature in the first block pass verification. The node operation executing circuit 1214 is configured to respond to the node operation request when the voting result in the first block satisfies a first preset condition, wherein the first preset condition is that a number of votes passed is greater than a first preset number threshold. When the first operation is a creating operation, after the first node 1210 performs the first operation on the second node through the system node management contract, the second node become a blockchain node in the blockchain system 1200. Correspondingly, the blockchain system 1200 may also comprise the second node, and the second node may also comprise a voting circuit. The voting circuit in the second node is configured to send a second voting request to a chain creator in the blockchain system, wherein the second voting request includes the role information of the second node, and is used for requesting the chain creator to vote on the role information of the second node. A target chain creator in the blockchain system 1200 is configured to collect a voting result of the chain creator for the role information of the second node and corresponding voting signature, and to set the role information of the second node in the blockchain system based on the voting result when the voting result and the corresponding voting signature for the role information of the second node pass verification.

Optionally, the node operation request includes any one or more of a first contract name to be called, a node type of the second node, a first operation and a submission account, the first contract name being a name of a system node management contract in the blockchain system, the system node management contract being deployed on a blockchain node in the blockchain system with role information being a node manager, and the first operation being an operation to be executed for the second node.

Optionally, the voting circuit 1212 is configured for example to send a first voting request to the another node manager through the system node management contract, wherein the another node manager is configured to vote on the node operation request through the system node management contract. The node operation executing circuit 1214 responds to the node operation request by executing the first operation for the second node through the system node management contract and broadcasting the node information of the second node to the blockchain system, wherein the node information of the second node includes any one or more of the node type, node name, node address, role information and node status of the second node and the voting signature of at least one node manager for the node operation request.

Optionally, the first operation comprises any one or more of a creating operation, an updating operation, a deleting operation or a reporting operation: when the first operation is a creating operation or an updating operation, the node status of the second node is valid; and when the first operation is a deleting operation or a reporting operation, the node status of the second node is invalid.

Optionally, the role information of the second node includes any one or more of a chain creator, a node manager, a contract manager, a parameter manager, a role manager and an ordinary user. The chain creator is determined by voting by blockchain nodes in the blockchain system, and is configured to manage the node manager, the contract manager, the parameter manager and the role manager; the node manager is configured to update the system node management contract and to vote on the node operation request: the contract manager is configured to update the system contract management contract in the blockchain system and to vote on a contract review request for any smart contract in the blockchain system: the parameter manager is configured to update the system parameter management contract in the blockchain system and to vote on a system upgrade request: the role manager is configured to update the system authority role management contract in the blockchain system and to vote on a node authority role authentication request; and the ordinary user is configured to release transactions and smart contracts in the blockchain system. The target chain creator may set the role information of the second node in the blockchain system based on the voting result by updating the role information of the second node to a corresponding manager list in the blockchain system in a case where the role information of the second node includes any one or more of a node manager, a contract manager, a parameter manager and a node role manager and where the voting result for the role information of the second node satisfies the first preset condition.

Optionally, the blockchain system 1200 may further comprise a third node and a fourth node, wherein the third node is a blockchain node in the blockchain system 1200 with the role information being an ordinary user, and the fourth node is a blockchain node in the blockchain system 1200 with the role information being the contract manager. The third node may comprise a contract review request circuit, and the fourth node comprises a contract review circuit and a contract operation circuit. The contract review request circuit is configured to determine a smart contract to be operated and to send a contract review request for the smart contract to be operated to the contract manager in the blockchain node, wherein the contract review request comprises any one or more of a second contract name to be called, a contract type of the smart contract to be operated, a contract content of the smart contract to be operated, a second operation and an account of the third node, and the second contract name is a name of a system contract management contract in the blockchain system. The second operation is an operation to be executed for the smart contract to be operated. The contract review circuit is configured to collect a voting result of at least one contract manager for the contract review request and a corresponding voting signature through the system contract management contract, to package the obtained voting result and corresponding voting signature of at least one contract manager for the contract review request into a second block, and to broadcast the second block to the blockchain system 1200. A signature verification circuit of at least one blockchain node in the blockchain system 1200 is configured to verify at least one voting result and the corresponding voting signature in the second block, and if at least one voting result and the corresponding voting signature in the second block pass verification, the second block is synchronized to the local ledger. The contract operation circuit is configured to execute the second operation on the smart contract to be operated when the voting result in the second block satisfies the first preset condition, and to broadcast the contract information of the smart contract to be operated to the blockchain system 1200.

Optionally, the contract information comprises any one or more of a contract type, a contract name, a contract address, a contract function description and a contract status of the smart contract to be operated and the voting signature of the contract manager for the contract review request.

Optionally, the blockchain system 1200 may further comprise a fifth node. The fifth node may be a blockchain node in the blockchain system with role information being a parameter manager. The fifth node may comprise a receiving circuit, a parameter updating circuit and a system upgrading circuit. The receiving circuit of the fifth node is configured to receive a system upgrade request sent by a chain creator in the blockchain system 1200, wherein the system upgrade request comprises any one or more of a third contract name to be called, a target parameter type to be adjusted, a parameter value and an account of the chain creator sending the system upgrade request, the third contract name is a name of a system parameter management contract in the blockchain system, and the system parameter management contract is deployed on a blockchain node in the blockchain system with role information being the parameter manager. The parameter management circuit is configured to obtain a voting result of at least one parameter manager in the blockchain system for the system upgrade request and a corresponding voting signature through the system parameter management contract, to package the obtained voting result and corresponding voting signature into a third block, and to broadcast the third block to the blockchain system, wherein the parameter manager is configured to update the system parameter management contract in the blockchain system and to vote on the system upgrade request. A signature verification circuit of at least one blockchain node in the blockchain system 1200 is configured to verify at least one voting result and the corresponding voting signature in the third block, and if at least one voting result and the corresponding voting signature in the third block pass verification, the third block is synchronized to the local ledger. The parameter updating circuit is configured to upgrade the blockchain system based on the system upgrade request when the voting result in the third block satisfies the first preset condition, so as to update a value of the target parameter type of the blockchain system to the parameter value, and broadcast any one or more of the value of the target parameter type of the upgraded blockchain system, a system status and the voting signature of at least one parameter manager for the system upgrade request to the blockchain system.

Optionally, the blockchain system 1200 may further comprise a sixth node. The sixth node is a blockchain node in the blockchain system with role information being a role manager. The sixth node comprises an authority role authentication circuit, a voting circuit and an authority role operation circuit. The authority role authentication circuit is configured to receive an authority role authentication request sent by a seventh node, wherein the seventh node is an authority node for issuing a certificate, the authority role authentication request comprises any one or more of a fourth contract name to be called, a role type of the seventh node, a public key of the seventh node, a third operation and an account of the seventh node, the fourth contract name is a name of a system authority role management contract in the blockchain system, the system authority role management contract is deployed on a blockchain node in the blockchain system with role information being the role manager, and the third operation is an operation to be executed for the seventh node. The voting circuit of the sixth node is configured to collect a voting result of at least one role manager for the authority role authentication request and a corresponding voting signature through the system authority role management contract, to package the obtained voting result and corresponding voting signature of at least one role manager for the authority role authentication request into a fourth block, and to broadcast the fourth block to the blockchain system. A signature verification circuit of at least one blockchain node in the blockchain system 1200 is configured to verify at least one voting result and the corresponding voting signature in the fourth block, and if at least one voting result and the corresponding voting signature in the fourth block pass verification, the fourth block is synchronized to the local ledger. The authority role operation circuit is configured to perform the third operation on the seventh node when the voting result in the fourth block satisfies the first preset condition, and to broadcast the authority role information of the seventh node to the blockchain system. The authority role information includes the role type, the public key, an address of the account of the seventh node, a role information description of the seventh node, a role status of the seventh node, and a voting signature of at least one role manager for the authority role authentication request.

Optionally, the blockchain system 1200, as a first blockchain system, may communicate with a second blockchain system, and the first blockchain system and the second blockchain system jointly comprise a plurality of eighth nodes. A blockchain node in the first blockchain system and/or the second blockchain system comprises: a notary determination circuit, configured to determine target nodes from the plurality of eighth nodes through a proof-of-stake mechanism based on digital currency assets in the first blockchain system and/or the second blockchain system, and to set the role information of at least one determined target node as a notary; and a cross-chain transaction circuit, configured to process a cross-chain payment bill between the first blockchain system and the second blockchain system through a notary alliance including notary nodes, wherein the notary node refers to an eighth node of which role information is a notary. The notary determination circuit may be for example configured to determine at least one target node from the plurality of eighth nodes through a proof-of-stake mechanism based on digital currency assets in the first blockchain system; and to determine at least one target node from the plurality of eighth nodes through a proof-of-stake mechanism based on digital currency assets in the second blockchain system.

It is understood that the detailed implementation of the above-mentioned circuits is the same as that of the corresponding method steps described above, so the description of the corresponding method steps can be used as a reference, and will not be repeated here.

Figure 12:
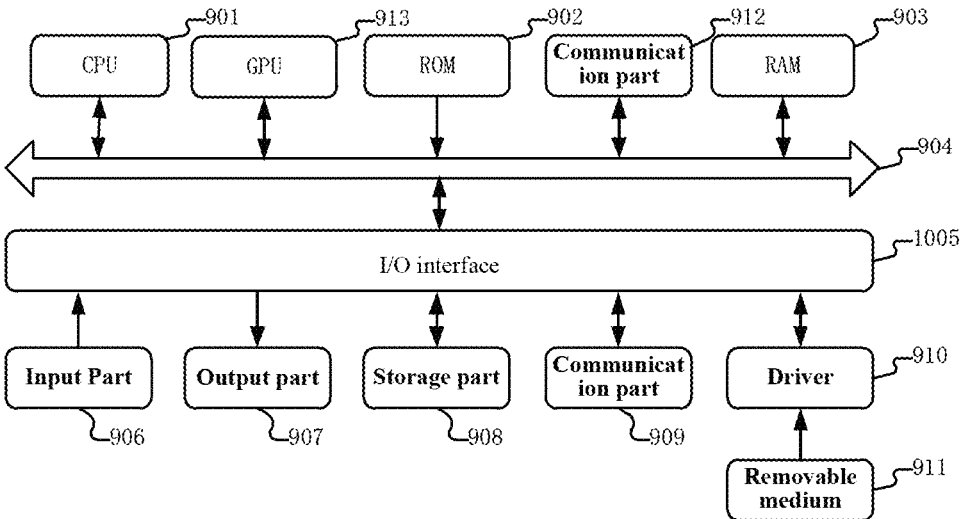
FIG. 12 is a structural diagram of an electronic apparatus according to an embodiment of the disclosure.

FIG. 12 is a structural diagram of an electronic apparatus according to an embodiment of the disclosure. Refer to FIG. 12 which shows a structural diagram of an electronic apparatus suitable for implementing a terminal apparatus or a server according to an embodiment of the disclosure. As shown in FIG. 12, the electronic apparatus comprises one or more processors, a communication part, etc. The one or more processors include, for example, one or more central processing units (CPUs) 901 and/or one or more image processors (GPUs) 913, etc. The processors may perform various appropriate actions and processes according to executable instructions stored in a read-only memory (ROM) 902 or executable instructions loaded into a random access memory (RAM) 903 from a storage part 908. The communication part 912 may comprise, but is not limited to, a network card which may comprise but is not limited to an InfiniBand (IB) network card. The processors may communicate with the read-only memory 902 and/or the random access memory 903 to execute the executable instructions, connect with the communication part 912 through a bus 904, and communicate with other target equipment through the communication part 912, so as to complete the operations corresponding to any method for blockchain authority management in the embodiments of the disclosure. For example, a first node receives a node operation request for second nodes, wherein the first node is a blockchain node in a blockchain system with role information being a node manager, and the node type of the second node includes any one or more of a super node, a backbone node and a service node: the first node votes on the node operation request, wherein the node operation request comprises any one or more of a first contract name to be called, the node type of the second node, a first operation and a submission account, the first contract name is a name of a system node management contract in the blockchain system, the system node management contract is deployed on a blockchain node in the blockchain system with role information being a node manager, and the first operation is an operation to be executed for the second node: the first node sends a first voting request to another node manager in the blockchain system, wherein the first voting request requests the node manager to vote on the node operation request; and the first node obtains a voting result of the node manager on the node operation request and a voting signature corresponding to the voting result, packages the obtained voting result and voting signature into a first block, and broadcasts the first block to the blockchain system. At least one blockchain node in the blockchain system verifies at least one voting result and the corresponding voting signature in the first block, and synchronizes the first block into a local ledger if the at least one voting result and the corresponding voting signature in the first block pass verification: the first node responds to the node operation request if the voting result in the first block satisfies a first preset condition, wherein the first preset condition is that the number of votes passed is greater than a first preset number threshold: the second node sends a second voting request to a chain creator in the blockchain system when the first operation is a creating operation, wherein the second voting request comprises the role information of the second node, and requests the chain creator to vote on the role information of the second node; and a target chain creator in the blockchain system collects a voting result of the chain creator for the role information of the second node and a corresponding voting signature, and sets the role information of the second node in the blockchain system based on the voting results when the voting result and the corresponding voting signature for the role information of the second node pass verification.

In addition, in the RAM 903, various programs and data required for the device operations may also be stored. A CPU 901, a ROM 902 and a RAM 903 are connected to each other through the bus 904. When the RAM 903 is provided, the ROM 902 is an optional part. The RAM 903 stores executable instructions, or writes executable instructions into the ROM 902 during running, and the executable instructions cause the processor 901 to perform the operations corresponding to the method for blockchain authority management described above. An input/output (I/O) interface 905 is also connected to the bus 904. The communication part 912 may be integrally arranged or provided with multiple sub-circuits (for example, multiple IB network cards) and located on a bus link.

The following components are connected to the I/O interface 905: an input part 906 comprising a keyboard, a mouse and the like: an output part 907 comprising a cathode ray tube (CRT), a liquid crystal display (LCD), a speaker and the like: a storage part 908 comprising a hard disk and the like; and a communication part 909 comprising a network interface card such as a LAN card, a modem and the like. The communication part 909 performs communication processing via a network such as the Internet. A driver 911 is also connected to the I/O interface 905 as needed. A removable medium 911, such as a magnetic disk, an optical disk, a magneto-optical disk, a semiconductor memory, etc., is installed on the driver 911 as needed, so that a computer program read therefrom can be installed in the storage part 908 as needed. It is noted that the architecture shown in FIG. 12 is only an optional implementation. In practice, the number and types of components in FIG. 12 may be selected, deleted, added or replaced according to actual needs. Different functional components may be arranged separately or integrally, for example, GPU and CPU may be arranged separately or GPU may be integrated on CPU, communication components can be arranged separately or integrated on CPU or GPU, and so on. These alternative embodiments all fall within the protection scope of this disclosure.

For example, according to the embodiment of the disclosure, the process described above with reference to the flowchart may be implemented as a computer software program. For example, an embodiment of the disclosure provides a computer program product, which comprises a computer program tangibly embodied on a machine-readable medium. The computer program comprises a program code for executing the method shown in the flowchart, and the program code may comprise instructions correspondingly executing the method steps provided by the embodiment of the disclosure. For example, a first node receives a node operation request for second nodes, wherein the first node is a blockchain node in a blockchain system with role information being a node manager, and the node type of the second node includes any one or more of a super node, a backbone node and a service node: the first node votes on the node operation request, wherein the node operation request comprises any one or more of a first contract name to be called, the node type of the second node, a first operation and a submission account, the first contract name is a name of a system node management contract in the blockchain system, the system node management contract is deployed on a blockchain node in the blockchain system with role information being a node manager, and the first operation is an operation to be executed for the second nodes: the first node sends a first voting request to another node manager in the blockchain system, wherein the first voting request requests the node manager to vote on the node operation request; and the first node obtains a voting result of the node manager on the node operation request and a voting signature corresponding to the voting result, packages the obtained voting result and voting signature into a first block, and broadcasts the first block to the blockchain system. At least one blockchain node in the blockchain system verifies at least one voting result and the corresponding voting signature in the first block, and synchronizes the first block into a local ledger if the at least one voting result and the corresponding voting signature in the first block pass verification: the first node responds to the node operation request if the voting result in the first block satisfies a first preset condition, wherein the first preset condition is that the number of votes passed is greater than a first preset number threshold: the second node sends a second voting request to a chain creator in the blockchain system when the first operation is a creating operation, wherein the second voting request comprises the role information of the second node, and requests the chain creator to vote on the role information of the second node; and a target chain creator in the blockchain system collects a voting result of the chain creator for the role information of the second nodes and a corresponding voting signature, and sets the role information of the second nodes in the blockchain system based on the voting result when the voting result and the corresponding voting signature for the role information of the second nodes pass verification.

All the embodiments in this specification are described in a progressive way, and each embodiment focuses on the differences from other embodiments. The same and similar parts among the embodiments may be referred to one another. As the above system embodiments are basically similar to the method embodiments, the description is relatively simple, and please refer to the description of the method embodiments for relevant information.

The method and device of the disclosure may be implemented in many ways. For example, the method and device of the disclosure may be implemented by software, hardware, firmware or any combination thereof. The above order of steps in the method is only for illustration, and the steps of the method of the disclosure are not limited to the order specifically described above, unless otherwise specified. Further, in some embodiments, the disclosure may also be implemented as programs recorded in a recording medium, which include machine-readable instructions for implementing the method according to the disclosure. Thus, the disclosure also covers a recording medium storing programs for executing the method according to the disclosure. The description of the disclosure has been presented for purposes of illustration and description, and is not exhaustive or intended to limit the disclosure to the disclosed form. Many modifications and variations will be obvious to those skilled in the art. The embodiments are chosen and described in order to better explain the principles and practical application of the disclosure, and to enable those skilled in the art to understand the disclosure and design various embodiments with various modifications that are suited to the specific use.

What is claimed is:

1. A method for blockchain authority management, which is applied to a blockchain system, comprising:

receiving, by a first node, a node operation request for a second node, the first node being a blockchain node in the blockchain system with role information being a node manager, and a node type of the second node including any one or more of a super node, a backbone node and a service node;

voting, by the first node, on the node operation request, the node operation request comprising any one or more of a first contract name to be called, the node type of the second node, a first operation and a submission account, the first contract name being a name of a system node management contract in the blockchain system, the system node management contract being deployed on a blockchain node in the blockchain system with role information being a node manager, and the first operation being an operation to be executed for the second node;

sending, by the first node, a first voting request to another node manager in the blockchain system, the first voting request requesting the another node manager to vote on the node operation request;

obtaining, by the first node, a voting result of the node manager on the node operation request and a voting signature corresponding to the voting result, packaging the obtained voting result and voting signature into a first block, and broadcasting the first block to the blockchain system;

verifying, by at least one blockchain node in the blockchain system, at least one voting result and a corresponding voting signature in the first block, and synchronizing the first block into a local ledger in a case where the at least one voting result and the corresponding voting signature in the first block pass verification;

responding, by the first node, to the node operation request in a case where the voting result in the first block satisfies a first preset condition with a number of votes passed being greater than a first preset number threshold;

sending, by the second node, a second voting request to a chain creator in the blockchain system in a case where the first operation is a creating operation, the second voting request comprising the role information of the second node and requesting the chain creator to vote on the role information of the second node; and collecting, by a target chain creator in the blockchain system, a voting result of the chain creator for the role information of the second node and a corresponding voting signature, and setting the role information of the second node in the blockchain system based on the voting result in a case where the voting result and the corresponding voting signature for the role information of the second node pass verification.

2. The method of claim 1, wherein the sending, by the first node, the first voting request to another node manager in the blockchain system comprises:

sending, by the first node, a first voting request to the another node manager through the system node management contract, the another node manager being configured to vote on the node operation request through the system node management contract; and wherein the responding, by the first node, to the node operation request comprises:

executing, by the first node, the first operation for the second node through the system node management contract, and broadcasting the node information of the second node to the blockchain system, the node information of the second node including any one or more of the node type, a node name, a node address, role information and a node status of the second node, and a voting signature of at least one node manager for the node operation request.

3. The method of claim 2, wherein the first operation comprises any one or more of a creating operation, an updating operation, a deleting operation or a reporting operation, wherein the node status of the second node is valid in a case where the first operation is the creating operation or the updating operation, and wherein the node status of the second node is invalid in a case where the first operation is the deleting operation or the reporting operation.

4. The method of claim 2, wherein the role information of the second node includes any one or more of a chain creator, a node manager, a contract manager, a parameter manager, a role manager and an ordinary user; and wherein the chain creator is determined by voting by a blockchain node in the blockchain system, and is configured to manage the node manager, the contract manager, the parameter manager and the role manager; the node manager is configured to update the system node management contract and to vote on the node operation request; the contract manager is configured to update the system contract management contract in the blockchain system and to vote on a contract review request for any smart contract in the blockchain system; the parameter manager is configured to update the system parameter management contract in the blockchain system and to vote on a system upgrade request; the role manager is configured to update the system authority role management contract in the blockchain system and to vote on a node authority role authentication request; and the ordinary user is configured to release transactions and smart contracts in the blockchain system.

5. The method of claim 4, further comprising:

determining, by a third node, a smart contract to be operated, and sending a contract review request for the smart contract to be operated to the contract manager in the blockchain node, the third node being a blockchain node in the blockchain system with role information being an ordinary user, the contract review request comprising any one or more of a second contract name to be called, a contract type of the smart contract to be operated, a contract content of the smart contract to be operated, a second operation and an account of the third node, the second contract name being a name of a system contract management contract in the blockchain system, and the second operation being an operation to be executed for the smart contract to be operated;

collecting, by a fourth node, a voting result of at least one contract manager for the contract review request and a corresponding voting signature through the system contract management contract, packaging the obtained voting result of the at least one contract manager for the contract review request and the corresponding voting signatures into a second block, and broadcasting the second block to the blockchain system, the fourth node being a blockchain node in the blockchain system with role information being the contract manager;

verifying, by at least one blockchain node in the blockchain system, at least one voting result and a corresponding voting signature in the second block, and synchronizing the second block into a local ledger in a case where the at least one voting result and the corresponding voting signature in the second block pass verification; and performing, by the fourth node, the second operation on the smart contract to be operated and broadcasting the contract information of the smart contract to be operated to the blockchain system, in a case where the voting result in the second block satisfies the first preset condition.

6. The method of claim 5, wherein the contract information comprises any one or more of a contract type, a contract name, a contract address, a contract function description and a contract status of the smart contract to be operated and the voting signature of the contract manager for the contract review request.

7. The method of claim 1, wherein the setting the role information of the second node in the blockchain system based on the voting result comprises:

updating the role information of the second node to a corresponding manager list in the blockchain system in a case where the role information of the second node includes any one or more of a node manager, a contract manager, a parameter manager and a node role manager, and where the voting result for the role information of the second node satisfies a first preset condition.

8. The method of claim 1, further comprising:

receiving, by a fifth node, a system upgrade request sent by the chain creator in the blockchain system, the system upgrade request comprising any one or more of a third contract name to be called, a target parameter type to be adjusted, a parameter value and an account of the chain creator sending the system upgrade request, the fifth node being a blockchain node in the blockchain system with role information being a parameter manager, the third contract name being a name of a system parameter management contract in the blockchain system, and the system parameter management contract being deployed on a blockchain node in the blockchain system with role information being the parameter manager;

obtaining, by the fifth node, a voting result of at least one parameter manager in the blockchain system for the system upgrade request and a corresponding voting signatures through the system parameter management contract, packaging the obtained voting result and corresponding voting signature into a third block, and broadcasting the third block to the blockchain system, the parameter manager being configured to update the system parameter management contract in the blockchain system and to vote on the system upgrade request;

verifying, by at least one blockchain node in the blockchain system, at least one voting result and a corresponding voting signature in the third block, and synchronizing the third block into a local ledger in a case where the at least one voting result and the corresponding voting signature in the third block pass verification; and in a case where the voting result in the third block satisfies the first preset condition, upgrading, by the fifth node, the blockchain system based on the system upgrade request to update a value of the target parameter type of the blockchain system to the parameter value, and broadcasting any one or more of the value of the target parameter type of the upgraded blockchain system, a system status and the voting signature of at least one parameter manager for the system upgrade request to the blockchain system.

9. The method of claim 1, further comprising:

receiving, by a sixth node, an authority role authentication request sent by a seventh node, the sixth node being a blockchain node in the blockchain system with role information being a role manager, the seventh node being an authority node configured to issue a certificate, the authority role authentication request comprising any one or more of a fourth contract name to be called, a role type of the seventh node, a public key of the seventh node, a third operation and an account of the seventh node, the fourth contract name being a name of the system authority role management contract in the blockchain system, the system authority role management contract being deployed on a blockchain node in the blockchain system with role information being the role manager, and the third operation being an operation to be executed for the seventh node;

collecting, by the sixth node, a voting result of at least one role manager for the authority role authentication request and a corresponding voting signature through the system authority role management contract, packaging the obtained voting result of the at least one role manager for the authority role authentication request and the corresponding voting signature into a fourth block, and broadcasting the fourth block to the blockchain system;

verifying, by at least one blockchain node in the blockchain system, at least one voting result and a corresponding voting signature in the fourth block, and synchronizing the fourth block into a local ledger in a case where the at least one voting result and the corresponding voting signature in the fourth block pass verification; and in a case where the voting result in the fourth block satisfies the first preset condition, performing, by the sixth node, the third operation on the seventh node and broadcasting the authority role information of the seventh node to the blockchain system.

10. The method of claim 9, wherein the authority role information of the seventh node includes any one or more of a role type, a public key, an address of the account of the seventh node, a role information description of the seventh node, a role status of the seventh node, and a voting signature of at least one role manager for the authority role authentication request.

11. The method of claim 1, wherein the blockchain system communicates as a first blockchain system with a second blockchain system, the first blockchain system and the second blockchain system jointly comprise a plurality of eighth nodes, and the method further comprises:

based on digital currency assets in the first blockchain system and/or the second blockchain system, determining target nodes from the plurality of eighth nodes through a proof-of-stake mechanism, and setting role information of at least one determined target node as a notary; and processing, by a notary alliance including notary nodes, a cross-chain payment bill between the first blockchain system and the second blockchain system, the notary node being an eighth node with role information being a notary.

12. The method of claim 11, wherein the determining target nodes from the plurality of eighth nodes through a proof-of-stake mechanism based on digital currency assets in the first blockchain system and/or the second blockchain system comprises:

determining, based on the digital currency assets in the first blockchain system, at least one target node from the eighth nodes through the proof-of-stake mechanism; and determining, based on the digital currency assets in the second blockchain system, at least one target node from the eighth nodes through the proof-of-stake mechanism.

13. The method of claim 11, wherein the processing, by the notary alliance including notary nodes, the cross-chain payment bill between the first blockchain system and the second blockchain system comprises:

generating, a first wallet multi-signed by the notary nodes in the first blockchain system, and generating a second wallet multi-signed by the notary nodes in the second blockchain system; and in a case where at least one notary node detects the generation of a first bill for digital currency asset transfer to the first wallet, activating, in the second wallet, second assets corresponding to the amount of the first assets recorded in the first bill, generating a second bill multi-signed by the notary nodes in the second blockchain system, and transferring the second assets to an asset receiving address designated by a client in the second blockchain system.

14. The method of claim 13, further comprising:

in a case where at least one notary node detects that a third bill for digital currency asset transfer to the second wallet is generated, the third bill is associated with the second bill, and the digital currency assets transferred in the third bill match the second assets, generating, in the first blockchain system, a fourth bill multi-signed by the notary nodes and associated with the first bill, and transferring the first assets to an asset receiving address designated by the client in the first blockchain system.

15. The method of claim 11, wherein the processing, by the notary alliance including notary nodes, the cross-chain payment bill between the first blockchain system and the second blockchain system comprises:

in a case where the target nodes are determined, activating a first smart contract pre-deployed in the first blockchain system, and informing a client that needs to transfer digital currency assets from the first blockchain system to the second blockchain system through the first smart contract to configure an asset receiving address for paying bills as the first wallet preset in the first blockchain system;

in a case where the first bill for digital currency asset transfer to the first wallet is detected through the first smart contract, verifying the first bill in the notary alliance by triggering a practical Byzantine fault tolerance mechanism and announcing a verification result the second blockchain system; and after detecting that verification of the first bill in the notary alliance is completed through a second smart contract pre-deployed in the second blockchain system, activating, in a preset second wallet of the second blockchain system, second assets corresponding to the amount of the first assets recorded in the first bill, generating a second bill in the second blockchain system, and transferring the second assets to the asset receiving address designated by the client in the second blockchain system.

16. The method of claim 15, further comprising:

in a case where it is detected through the second smart contract that a third bill for digital currency asset transfer to the second wallet is generated, the third bill is associated with the second bill, and digital currency assets transferred in the third bill match with the second assets, verifying the third bill in the notary alliance by triggering a practical Byzantine fault tolerance mechanism and announcing a verification result to the first blockchain system; and in a case where it is detected through the first smart contract that the verification of the third bill is completed in the notary alliance, generating, in the first blockchain system, a fourth bill associated with the first bill, and transferring the first assets to the asset receiving address designated by the client in the first blockchain system.

17. The method of claim 11, wherein the processing, by the notary alliance including notary nodes, the cross-chain payment bill between the first blockchain system and the second blockchain system comprises:

detecting whether the notary node exists in a client initiating the cross-chain payment bill between the first blockchain system and the second blockchain system; and in a case where the notary node exists in the client initiating the cross-chain payment bill, not processing the cross-chain bill payment.

18. An electronic apparatus, comprising:

a memory storing executable instructions; and one or more processors communicating with the memory to execute the executable instructions so as to implement operations of the method of claim 1.

19. A blockchain system comprising:

a first node, the first node being a blockchain node in the blockchain system with role information being a node manager, and the first node being configured to:

receive a node operation request for a second node, a node type of the second node including any one or more of a super node, a backbone node and a service node; vote on the node operation request, the node operation request comprising any one or more of a first contract name to be called, the node type of the second node, a first operation and a submission account, the first contract name being a name of a system node management contract in the blockchain system, the system node management contract being deployed on a blockchain node in the blockchain system with role information being a node manager, and the first operation being an operation to be executed for the second node; send a first voting request to another node manager in the blockchain system, the first voting request requesting the another node manager to vote on the node operation request; and obtain a voting result of the node manager on the node operation request and a voting signature corresponding to the voting result, package the obtained voting result and vote signature into a first block, and broadcast the first block to the blockchain system; and at least one blockchain node, configured to:

verify at least one voting result and a corresponding voting signature in the first block, and synchronize the first block into a local ledger in a case where the at least one voting result and the corresponding voting signature in the first block pass verification; wherein the first node responds to the node operation request in a case where the voting result in the first block satisfies a first preset condition with a number of votes passed being greater than a first preset number threshold; and the second node, configured to:

send a second voting request to a chain creator in the blockchain system when the first operation is a creating operation, the second voting request comprising role information of the second node and requesting the chain creator to vote on the role information of the second node;

wherein a voting result of the chain creator for the role information of the second node and a corresponding voting signature are collected by a target chain creator in the blockchain system, and the role information of the second node is set in the blockchain system based on the voting result in a case where the voting result and the corresponding voting signature for the role information of the second node pass verification.

20. An electronic apparatus, comprising the blockchain system of claim 19.

* * * * *